(12) United States Patent
Chosa

(10) Patent No.: US 7,929,037 B2
(45) Date of Patent: Apr. 19, 2011

(54) DIGITAL CAMERA

(75) Inventor: Takashi Chosa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1097 days.

(21) Appl. No.: 11/195,121

(22) Filed: Aug. 2, 2005

(65) Prior Publication Data

US 2006/0023100 A1   Feb. 2, 2006

(30) Foreign Application Priority Data

Aug. 2, 2004   (JP) ................................ 2004-225814

(51) Int. Cl.
*H04N 5/222* (2006.01)

(52) U.S. Cl. ......... 348/333.01; 348/333.02; 348/333.03; 348/333.04; 348/333.05; 348/333.06

(58) Field of Classification Search ............... 348/333.01–333.09; 358/909.1
See application file for complete search history.

(56) References Cited

U.S. PATENT DOCUMENTS

| | | | |
|---|---|---|---|
| 5,805,215 A * | 9/1998 | Mizoguchi | 348/231.5 |
| 6,020,920 A | 2/2000 | Anderson | |
| 6,538,698 B1 * | 3/2003 | Anderson | 348/333.05 |
| 7,268,808 B2 * | 9/2007 | Kurokawa et al. | 348/231.3 |
| 2002/0067856 A1 | 6/2002 | Fujii et al. | |
| 2004/0008906 A1 | 1/2004 | Webb | |
| 2004/0119845 A1 * | 6/2004 | Kaku | 348/231.99 |

FOREIGN PATENT DOCUMENTS

| | | |
|---|---|---|
| JP | 07-295873 A | 11/1995 |
| JP | 11-136573 | 5/1999 |
| JP | 2000-076302 | 3/2000 |
| JP | 2000-076302 A | 3/2000 |
| JP | 2002-342743 | 11/2002 |
| JP | 2003-141130 | 5/2003 |
| JP | 2003-233800 | 8/2003 |
| JP | 2003-303333 | 10/2003 |
| WO | 9857491 A | 12/1998 |
| WO | WO 03/051033 A1 | 6/2003 |

OTHER PUBLICATIONS

Image Indexing and Retrieval Using Visual Keyword Histograms. Joo-Hwee Lim and Jesse S. Jin. 0-7803-7304, Aug. 26, 2002. vol. 1, p. 213-216. C2002 IEEE. (XP010604344).
All of the above references were cited in a Jan. 22, 2009 European Search Report of the counterpart European Patent Application No. 05254732.0.

* cited by examiner

*Primary Examiner* — Yogesh K Aggarwal
(74) *Attorney, Agent, or Firm* — Cowan, Liebowitz & Latman, P.C.

(57) ABSTRACT

An digital camera includes a storage medium for connecting a storage medium having image information stored thereon and a display unit that displays the image information stored on the storage medium. The digital camera displays characteristic images symbolizing one or more pieces of the image information stored on the storage medium on the display unit. The characteristic images include key images, images extracted by retrieval, or images obtained by analyzing plural pieces of image information.

3 Claims, 14 Drawing Sheets

DIGITAL CAMERA

FIELD OF THE INVENTION

This invention relates to a digital camera for managing various kinds of information and, more particularly, to a digital camera that displays image information and the like stored on a storage medium.

BACKGROUND OF THE INVENTION

Conventionally, information managing apparatuses such as a camera, a video camera, a cellular phone, a compact disk storing and reproducing apparatus, a Digital Versatile Disk (DVD) recording and reproducing apparatus, which display image information and the like stored on a storage medium on display unit or store image information and the like on a storage medium, have been put to practical use.

In particular, a camera for image-retrieving an image stored on a storage medium is proposed in Japanese Patent Laid-Open No. 2000-76302. This camera is useful in that the camera can retrieve a desired image only from a storage medium that can be connected at a time.

Note that, concerning judgment on similarity of images executed in image retrieval processing, in addition to a judgment method described in Japanese Patent Laid-Open No. 2000-76302, a judgment method described in Japanese Patent Laid-Open No. 2003-233800 is known.

Incidentally, various memory type storage media such as a compact Flash® card (hereinafter referred to as CF card) and various disk type storage media such as a Compact Disc Read Only Memory (CD-ROM), a Compact Disc Recordable (CD-R), a Compact Disc Rewritable (CD-RW), and a Digital Versatile Disc (DVD) become less expansive every year. Moreover, a storage capacity of a storage medium increases. Thus, it is predicted that, in future, even an individual owns a large number of large capacity storage media.

However, in the conventional techniques, although it is possible to find out a desired image from a storage medium that can be connected at a time, there still is a problem in finding out a desired image from plural or a large number of storage media.

In the conventional techniques, every time a storage medium is replaced, image retrieval has to be executed on all pieces of image information stored on the storage medium. Therefore, it is likely that it takes long to find out a target image and an operator is required to bear significant labor. This problem will attract more attention if a capacity of a storage medium increased and a user owns a large number of such storage media.

SUMMARY OF THE INVENTION

Therefore, it can be said that it is desired to make it possible for a user to grasp characteristics of contents stored on a storage medium in short time with an easy method.

It is an object of the invention to solve at least one of such problems and other problems. Note that the other problems would be understood through the entire specification.

The invention is characterized in that, when image information is stored on plural storage media, respectively, characteristic images, which allow a user to understand contents stored on the respective storage media, are displayed in a digital camera.

An digital camera according to a first aspect of the invention is a digital camera including: a storage medium interface that connects a storage medium having image information and the like stored thereon; and display unit that displays the image information and the like stored on the storage medium. In the digital camera, characteristic images for one or more pieces of the image information stored on the storage medium connected to the storage medium interface are displayed on the display unit.

The characteristic image unit an image representing characteristics of contents stored on the storage medium. In other words, an image symbolizing plural stored contents is the characteristic image.

For example, one or plural images, which symbolize contents stored on a storage medium, may be selected as characteristic images out of plural images stored on the storage medium. Alternatively, the digital camera may create one or plural characteristic images, which symbolize contents stored on the storage medium, on the basis of one or plural images included in the storage medium.

Preferably, a digital camera according to a second aspect of the invention is characterized in that, in the digital camera according to the first aspect of the invention, the characteristic images are displayed on the display unit with application of a power supply, connection of the storage medium, shift to a reproduction mode, or the like as a trigger.

A digital camera according to a third aspect of the invention is a digital camera that has at least a storage medium interface and stores image information and the like in a storage medium connected to the storage medium interface. The digital camera creates characteristic images for the image information stored on the connected storage medium.

Preferably, a digital camera according to a fourth aspect of the invention is characterized in that, in the digital camera according to the third aspect of the invention, the characteristic images created by the digital camera are stored on the storage medium.

Preferably, a digital camera according to a fifth aspect of the invention is characterized in that, in the digital camera according to the third aspect of the invention, the characteristic images created by the digital camera are stored on storing unit built-in or integrated in the digital camera.

Preferably, a digital camera according to a sixth aspect of the invention is characterized in that, in the digital camera according to any one of the first to the fifth aspect of the invention, one or plural characteristic images are used as the characteristic images.

Preferably, a digital camera according to a seventh aspect of the invention is characterized in that, in the digital camera according to any one of the first to the fifth aspects of the invention, one or plural images as a retrieval result retrieved from contents stored on the storage medium are used as the characteristic images.

Preferably, a digital camera according to an eighth aspect of the invention is characterized in that, in the digital camera according to any one of the first to the fifth aspect of the invention, one or plural analysis result image obtained by analyzing contents stored on the storage medium are used as the characteristic images.

A digital camera according to a ninth aspect of the invention is an digital camera that has at least display unit and a storage medium interface and displays image information and the like, which are stored on a storage medium connected to the storage medium interface, on the display unit. The digital camera sequentially reads out the image information stored on the connected storage medium, judges whether the read-out image information is similar to key images and the like, and counts the number of similar images and the like judged as similar to the key images to thereby diagrammatize and display the number of the similar images and the like for the key images and the like.

A digital camera according to a tenth aspect of the invention is a digital camera that has at least display unit and a storage medium interface and displays image information and the like, which are stored on a storage medium connected to the storage medium interface, on the display unit. The digital camera sequentially reads out image information stored on the connected storage medium, judges whether the read-out image information is similar to key images and the like, and reads out data such as date and time included in an image file of a similar image and the like judged as similar to the key images to thereby diagrammatize and display a distribution of date and time of imaging on the basis of the data.

Preferably, a computer program according to an eleventh aspect of the invention causes the digital camera according to any one of the first to the tenth aspects of the invention to operate appropriately.

According to the invention, there is an advantage that, when a detachably-attachable storage medium is attached to the digital camera, characteristic images of the storage medium are displayed. Thus, there is an advantage that a user can easily understand contents stored on the storage medium.

The digital camera according to the first aspect of the invention shows characteristic images to a user to indicate what is stored on the storage medium and what kind of characteristics contents stored on the storage medium have. This makes it possible for the user to easily recollect or estimate contents stored on the storage medium. For example, in finding out a desired image from a large number of storage media, the user can cause the digital camera to display characteristic images of the storage media, grasp rough stored contents of the respective storage media, and narrow down targets to several storage media. Since it is possible to narrow down target storage media easily, time for finding out a desired image finally is reduced. In other words, it is possible to find out a desired image from plural or a large number of storage media in shorter time and more easily than in the past.

According to the second aspect of the invention, in addition to the advantage of the first aspect of the invention, for example, a user can see characteristic images immediately after connecting the storage medium without performing complicated operation.

According to the third aspect of the invention, it is possible to acquire characteristic images concerning the storage medium using the digital camera. The user can recollect or estimate contents of the storage medium easily according to the acquired characteristic images. As a result, it is possible to provide a digital camera that makes it possible to find out a desired image in short time and easily from plural or a large number of storage media.

According to the fourth aspect of the invention, characteristic images are managed together with the storage medium. Thus, for example, when the storage medium is connected in a digital camera different from a digital camera that has created characteristic images, the user can see the characteristic images without being required of labor for creating characteristic images repeatedly.

According to the fifth aspect of the invention, for example, even when an unused capacity is not present in a storage medium, it is possible to store characteristic images in the internal storing unit. In addition, when readout speed of the internal storing unit is higher than readout speed of the storage medium, it is also possible to display the characteristic images at high speed.

According to the sixth aspect of the invention, there is an advantage that key images can also be used as characteristic images.

According to the seventh aspect of the invention, there is an advantage that images as a retrieval result image can also be used as characteristic images.

According to the eighth aspect of the invention, there is an advantage that images as an analysis result image can also be used as characteristic images.

According to the ninth aspect of the invention, it is possible to visually confirm what kind of images and how many images are included in a storage medium easily and promptly and is very useful.

According to the tenth aspect of the invention, it is possible to visually confirm a distribution of imaging time for an image present in a storage medium easily and promptly and is very useful.

It is possible to realize the digital camera according to any one of the first to the tenth aspects of the invention by executing the computer program according to the eleventh aspect of the invention on a digital camera. As a result, the same advantageous effect as the digital camera according to any one the first to the tenth aspects of the invention is shown.

As described above, the invention is very useful, has many advantages, and contributes to the industries significantly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Embodiments useful in understanding a superordinate concept, an intermediate concept, and a subordinate concept of the invention will be described below. Note that not all concepts included in the embodiments are always described in patent claims. However, it should be understood that the concepts are not excluded from a technical scope of the patent invention intentionally but are excluded from the description of the patent claims because the concepts are in a relation of equivalence to the patent invention.

In the embodiments described below, a digital camera will be explained as an example of an information managing apparatus according to the invention. Note that it goes without saying that, even if the invention is applied to other kinds of information processing apparatuses such as a video camera, a cellular phone, a disk storing and reproducing apparatus, a Digital Versatile Disc (DVD) recording and reproducing apparatus, and a personal computer (PC), the information managing apparatuses can be realized in the same manner.

In the embodiments, it is assumed that the digital camera has an image retrieval function. Note that the image retrieval function is not always required. Image retrieval is, when certain images are set as key images, extraction of other images having relevance to the key images. As a detailed method for the image retrieval, other than a method of comparing images disclosed in the conventional techniques and the like, there is a technique for comparing file names, acquisition time, comment information, and the like. Note that it goes without saying that the invention does not depend on an image retrieval method and various image retrieval methods can be adopted.

First Embodiment

Figure 1:
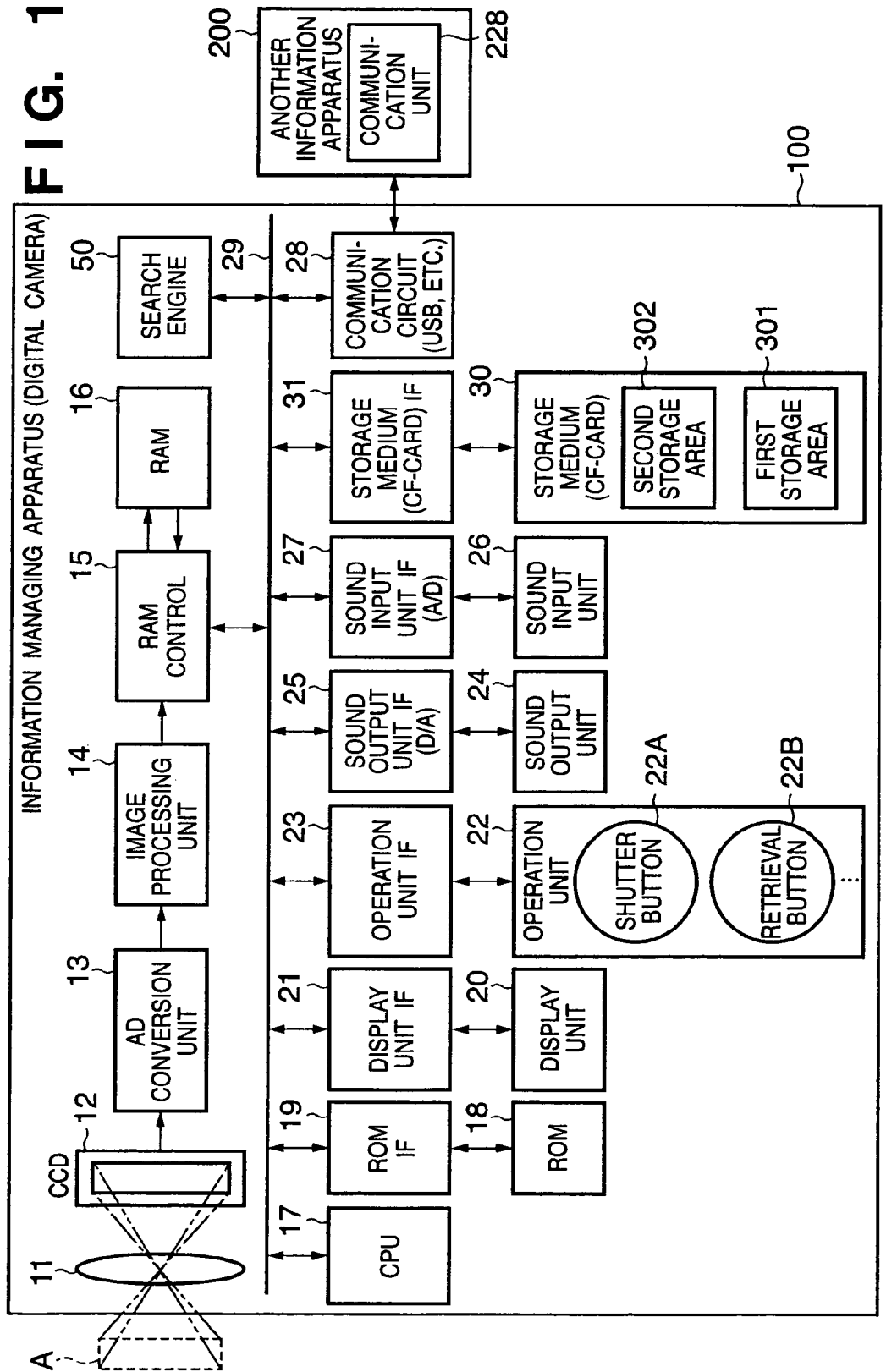
FIG. 1 is a block diagram showing an example of a constitution of an information managing apparatus according to an embodiment of the invention.
Figure 2:
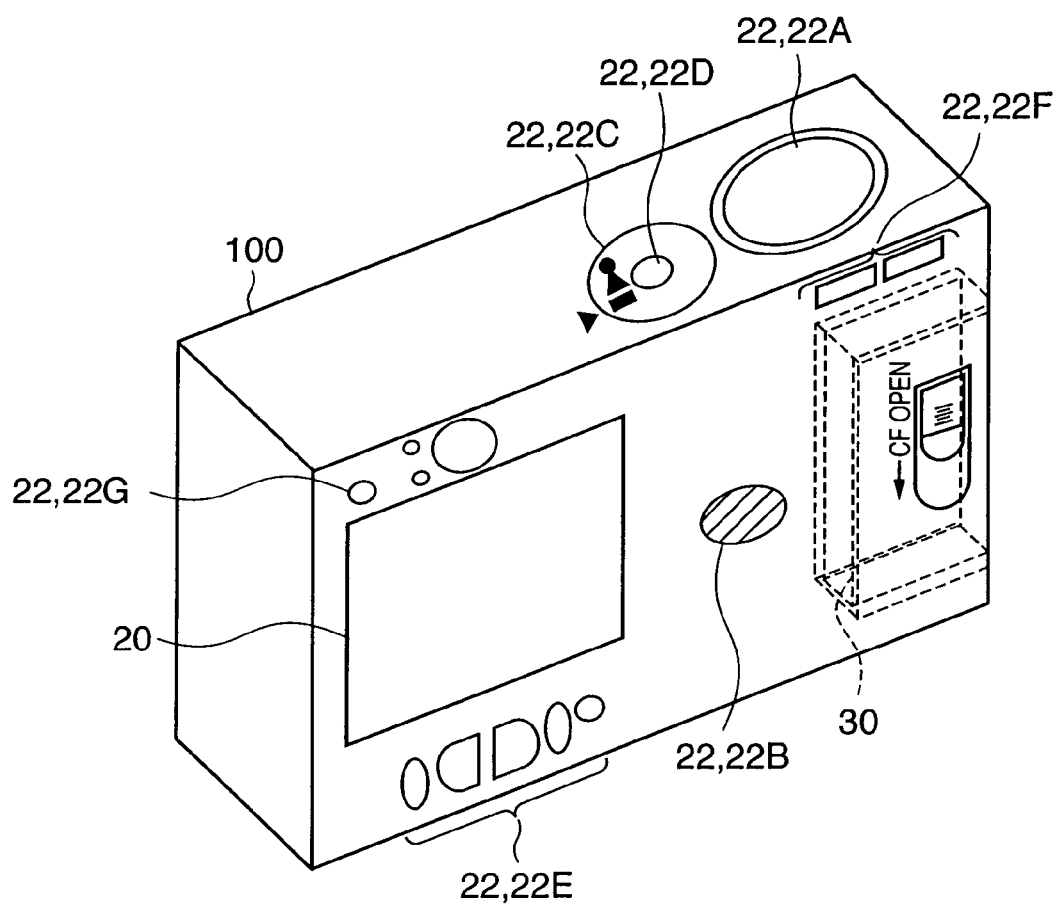
FIG. 2 is an external view of the information managing apparatus according to the embodiment.

FIG. 1 is a block diagram showing an example of a constitution of an information managing apparatus according to a first embodiment of the invention. It is possible to connect another information apparatus 200 such as a PC or a printer to an information managing apparatus 100 in this example. FIG. 2 is an external view of the information managing apparatus according to the first embodiment.

In FIGS. 1 and 2, reference numeral 100 denotes an information managing apparatus such as a digital camera, a digital video camera, a cellular phone with camera, or a Personal Digital Assistant (PDA) with camera. The information managing apparatus 100 can store a still image and a moving image as electronic data. The information managing apparatus 100 includes a shutter button 22A, a retrieval button 22B, a jog dial for mode setting 22C, a power supply switch 22D, a display & file operation related button 22E, a ZOOM & WIDE button 22F, and a DISP button 22G, which form an operation unit 22.

A display unit 20 is formed by a liquid crystal display and the like. The display unit 20 displays subject images, images already imaged, key images and a retrieval result in the case in which retrieval processing is performed, an operation guide for a user, and the like. In the invention, characteristic images are displayed on the display unit 20.

A storage medium housing unit, which is covered by a lid at the time of imaging and the like, is provided on a side of the information managing apparatus 100. A storage medium 30 is connected to the storage medium housing unit. As examples of the storage medium 30, there are a repeatedly readable and writable memory card such as a CF card, a magnetic recording medium, an optical recording medium, and a magneto-optical recording medium.

An internal structure and the like of the information managing apparatus 100 will be explained. In FIG. 1, reference sign A denotes a subject image; reference numeral 11 denotes an optical system such as a lens; 12, a Charge Coupled Device (CCD) (or Complementary Metal-Oxide-Semiconductor area (CMOS) sensor, etc.); and 13, an Analog Digital (AD) conversion unit. Reference numeral 14 denotes an image processing unit that applies signal processing such as shading correction and gamma conversion for converting a digital image input signal inputted through the AD conversion unit 13 into an RGB signal adapted to a human vision. Reference numeral 15 denotes a RAM controller. The RAM controller 15 is connected to a main CPU bus 29 and a Random Access Memory (RAM) 16 serving as storing unit.

Reference numeral 17 denotes a (main) Central Processing Unit (CPU) that controls the entire information managing apparatus 100. Reference numeral 18 denotes is a Read Only Memory (ROM) that stores a program in which a control method and the like for the entire information managing apparatus 100 is described. Reference numeral 19 denotes a ROMIF that functions as an interface between the ROM 18 and the main CPU bus 29. Reference numeral 24 denotes a sound output unit such as a speaker and a buzzer. Reference numeral 25 denotes a sound output unit IF including a DA converter. Reference numeral 26 denotes a sound input unit such as a microphone. Reference numeral 27 denotes a sound input unit IF including an AD converter.

Reference numeral 28 denotes a communication circuit serving as communication unit that should perform a function for communication with other information apparatuses and the like. The communication circuit 28 executes operations complying with standards such as USB, LAN, wireless LAN, IrDA, Bluetooth, IEEE1394. The communication circuit 28 communicates with the information apparatus 200 through a communication unit 228 mounted on another information apparatus 200 such as a PC or a printer. This makes it possible to transfer image data and the like imaged by the information managing apparatus 100 to the PC and store the image data in the PC or directly print the image data and the like with the printer or the like. This also makes it possible to remotely operate the information managing apparatus 100 from another information apparatus 200.

The display unit 20 is connected to the main CPU bus 29 via a display unit IF 21. It is possible to drive the display unit 20 from the (main) CPU 17. Similarly, the operation unit 22, which includes the shutter button 22A, the retrieval button 22B, the jog dial for mode setting 22C, the power supply switch 22D, the display & file operation related button 22E, the ZOOM & WIDE button 22F, and the DISP button 22G, is connected to the main CPU bus 29 via an operation unit IF 23. As a result, the information managing apparatus 100 recognizes an instruction, which is inputted from the operation unit 22, through the operation unit IF 23.

As shown in FIG. 1, the storage medium 30 is connected to the main CPU bus 29 via an IF for storage medium 31. An internal area of the storage medium 30 can be divided into a first storage area 301 storing general images and a second storage area 302 for storing characteristic images and the like. Note that various methods of dividing the internal area into two areas are conceivable. For example, the internal area may be divided into two areas by creating separate folders (directories) in an initial sequence or the like of the information managing apparatus 100. Alternatively, the internal area may be divided such that it is possible to access divided areas according to an address area.

A search engine 50 is a circuit that compares key image data and general image data to retrieve similar image data. The search engine 50 may be constituted by an Application Specific Integrated Circuit (ASIC) having a Direct Memory Access (DMA) function. It is also possible constitute the search engine 50 with a sub-CPU that is capable of operating in parallel with the CPU 17.

(Processing for Creating Characteristic Images)

Figure 3:
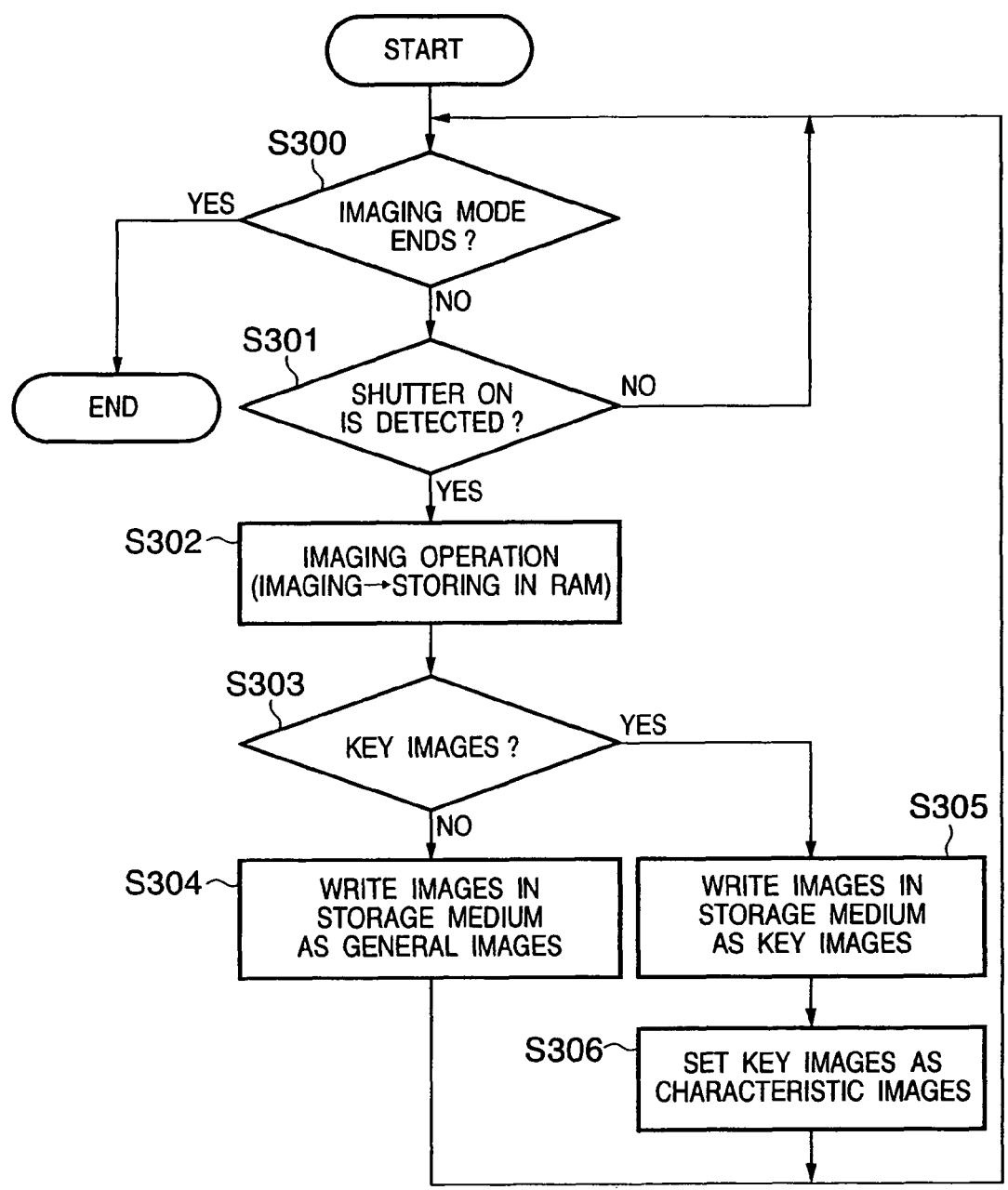
FIG. 3 is a flowchart showing an imaging operation, processing for writing information in a storage medium 30, and the like of the information managing apparatus according to the embodiment.

FIG. 3 is a flowchart showing an imaging operation, processing for writing information in the storage medium 30, and the like of the information managing apparatus according to the first embodiment.

It is assumed that the jog dial for mode setting 22C is set in an imaging mode and the power supply switch 22D is pressed to turn on the power supply. In this case, when considerable time elapses after the power ON and the initial sequence or the like ends, the information managing apparatus 100 shifts to a state of the imaging mode and, then, comes into a standby state.

In step S300, the CPU 17 polls a state of the jog dial 22C of the operation unit IF 23 and judges whether the imaging mode ends. If the imaging mode ends, the CPU 17 ends the flowchart. If the imaging mode is maintained, the CPU 17 proceeds to step S301.

In step S301, the CPU 17 judges whether at least the shutter button 22A is pressed. For example, when the shutter button 22A is pressed, a shutter button ON signal is generated in the operation IF 23. Thus, the CPU 17 can detect the ON signal by executing the polling. On the other hand, when the shutter button 22A and the retrieval button 22B are pressed simultaneously, a key image imaging signal (a simultaneous press signal) is generated in the operation unit IF 23 in addition to the shutter button ON signal. The generated shutter button ON signal is transmitted to the (main) CPU 17 in both imaging for general images and imaging for key images. Note that, in detecting the shutter button ON signal, for example, a constitution for detecting the shutter button ON signal according to interrupt processing may be adopted instead of a polling operation. If the shutter button ON signal cannot be detected, the CPU 17 returns to step S300. If the shutter button ON signal is detected, the CPU 17 proceeds to step S302.

In step S302, the CPU 17 starts an imaging operation. Specifically, the CCD 12 subjects an image of a subject image A, which is made incident on the CCD 12 via the optical system 11, to photoelectric conversion for each pixel and sends the image to the AD conversion unit 13. The AD conversion unit 13 subjects an analog value concerning density of each color of each pixel to AD conversion and sends a digital image input signal to the image processing unit 14. The image processing unit 14 executes signal processing such as shading correction and gamma conversion on the inputted digital image input signal to thereby convert the digital image input signal into a RGB signal adapted to human vision. As a result, respective pixel data and the like of still image data subjected to image processing are written and stored on the RAM 16 one after another via the RAM controller 15. All pixel data and additional data for one image are written in the RAM 16, whereby the imaging operation for one image ends. Note that, in this embodiment, the data are not written in the storage medium 30 immediately every time the imaging operation for one image ends but are written in the storage medium 30 collectively when the imaging operation for several images ends.

In step S303, the CPU 17 judges whether the image data stored on the RAM 16 is general image data or key image data. This judgment is performed when the CPU 17 accesses the operation unit IF 23 to confirm whether an imaging signal for imaging key images is generated. It goes without saying that the imaging signal for imaging key images and the imaging signal for general images are clearly distinguishable. As a result of the judgment, if an imaging operation is imaging for general images, the CPU 17 proceeds to step S304. If the imaging operation is imaging for key images, the CPU 17 proceeds to step S305.

In step S304, the CPU 17 writes the images stored on the RAM 16 in the storage medium 30 as general images. For example, the CPU 17 transfers the images stored on the RAM 16 to a first image storage area 301 of the storage medium 30 and stores the images in the first image storage area 301.

In step S305, the CPU 17 writes the images written and stored on the RAM 16 in the storage medium 30 as key images. For example, the CPU 17 transfers the images stored on the RAM 16 to a second image storage area 302 of the storage medium 30 and stores the images in the second image storage area 302.

In step S306, the CPU 17 sets the key images stored on the image storage area 302 as characteristic images. There are various methods of setting characteristic images. For example, information representing characteristic images may be written in a data file for the key images, characteristic images may be redundantly stored on a dedicated folder for storing the characteristic images, or a management file including file names of characteristic images may be created to store the management file in the storage medium 30 or the ROM 18.

In this way, in acquiring general image data, operation of only the shutter button is used as operation input. On the other hand, in acquiring key image data, simultaneous press of the shutter button and the retrieval button is used as operation input. As a result, the general image data and the key image data are inputted to the CPU 17 in different operation forms. Therefore, a user can easily separate two kinds of imaging operations clearly and select the imaging operations.

According to the information managing apparatus 100, general images and key images are stored on the identical storage medium 30 and the key images are separated from the general images and selectively stored. Thus, it is possible to take out the key images from the storage medium 30 easily. In other words, the key images are stored on a storage area separate form a storage area for a group of general images that could be large in quantity. Thus, it is possible to read out the key images easily and use the key images for image retrieval.

On the other hand, the key images are stored for retrieving general images stored on the storage medium 30. Thus, it is highly likely that the key images have high relevance with all or a part of a group of images stored on the storage medium 30.

In the first embodiment, one or plural images of the key images are characteristic images of the storage medium. Note that, as described above, the characteristic image unit a characteristic image that symbolizes contents stored on the storage medium. Thus, it can be said that this key images are characteristic images of the storage medium 30. In addition, storage of the key images in the storage medium 30 is equivalent to creation of characteristic images concerning image information stored on the storage medium 30 connected to the storage medium IF 31.

There are several methods of using the key images as the characteristic images. For example, there is a method in which the CPU 17 treats all stored key images as characteristic images. In this case, a step of setting characteristic images in step S306 is unnecessary.

Characteristic images may be selected from the key images. In other words, in step S306, the CPU 17 sets arbitrary one or plural images designated by the operation unit 22 as characteristic images. The CPU 17 may select characteristic images from the stored key images and narrow down the characteristic images. In this case, the CPU 17 may select arbitrary ones of the key images or may select characteristic images according to some standard. For example, the CPU 17 counts the number of times the respective key images are used for image retrieval and stores the number of times in the storage medium 30. The CPU 17 sets one or a predetermined number of key images, which have relatively a large number of times of use, as characteristic images. Alternatively, it is also possible that, as a result of image retrieval, the CPU 17 stores the number of pieces of retrieved image information (the number of hits) in the storage medium 30 for each of the key images to select one or a predetermined number of key images, which have relatively a large number of hits, as characteristic images.

(Processing for Displaying Characteristic Images)

Figure 4:
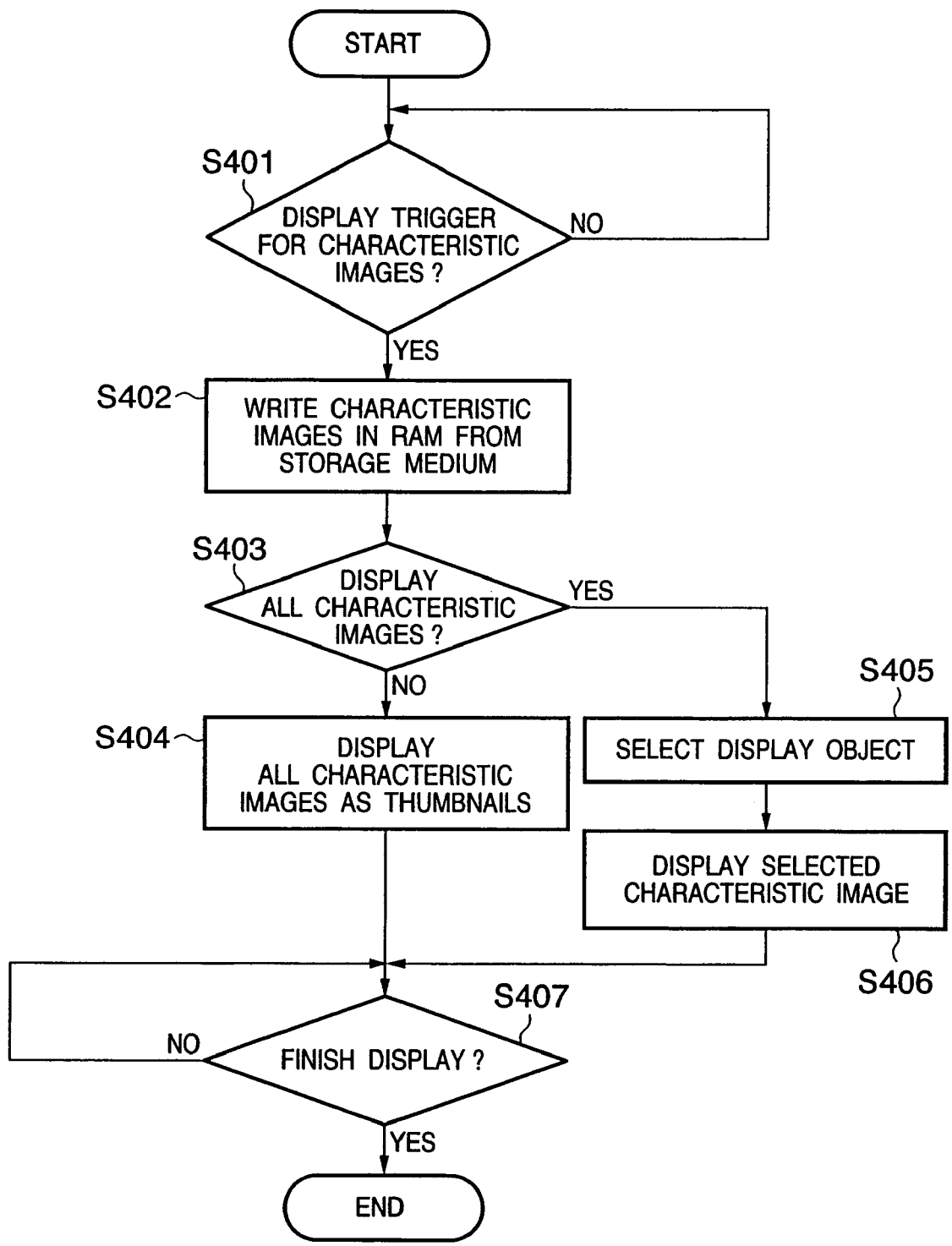
FIG. 4 is an exemplary flowchart concerning processing for displaying characteristic images according to the embodiment.

FIG. 4 is an exemplary flowchart concerning processing for displaying characteristic images according to the embodiment. Note that various triggers for the processing for displaying characteristic images are conceivable. For example, when a user operates the jog dial for mode setting 22C and the CPU 17 detects that the apparatus is switched from an imaging mode to a reproduction mode, when the power supply switch 22D is pressed in a state in which the jog dial for mode setting 22C is set in the reproduction mode and the CPU 17 detects that the power supply is turned on, when the CPU 17 detects simple application of a power supply, or when the CPU 17 detects connection of the storage medium 30 after application of a power supply, triggers for display may be set. In this case, at least one of the CPU 17 and the operation unit IF 23 functions as unit for detecting a display trigger for characteristic images.

In step S401, the CPU 17 judges whether a trigger for processing for displaying characteristic images has occurred. For example, the CPU 17 executes polling for the operation unit 22. As a result, if switching from the operation mode to the reproduction mode or the like is detected, the CPU 17 judges that a display trigger has occurred. Note that, in detecting the switching or the like, the CPU 17 may detect the switching or the like according to an interrupt signal instead of an operation of the polling. If a trigger for processing for displaying characteristic images is detected, the CPU 17 proceeds to step S402.

In step S402, the CPU 17 accesses the storage medium IF 31 to thereby read contents stored on the second storage area 302 of the storage medium 30 and read out image data set as characteristic images on the basis of the read stored contents. The CPU 17 writes all the image data of the characteristic images in the RAM 16 via the RAM controller 15.

In step S403, the CPU 17 judges how a display form is set when plural characteristic images are present. Concerning the processing for displaying characteristic images in this embodiment, all characteristic images stored on the storage medium 30 may be displayed or a part of the characteristic images may be displayed. For example, setting information is stored on the ROM 18 in advance and the CPU 17 only has to read out contents of the setting in the ROM 18 via the ROMIF 19 to recognize whether all the characteristic images are displayed or a part of the characteristic images are displayed (in the latter case, the CPU 17 also recognizes the number of images).

If the present setting is the display of all the characteristic images, the CPU 17 proceeds to step S404. The CPU 17 lays out image data of the plural characteristic images stored on the RAM 16 in order, then, sends all the image data to the display unit IF 21, and causes the display unit 20 to display the image data.

On the other hand, if the present setting is the display of a part of the characteristic images, the CPU 17 proceeds to step S405. The CPU 17 selects images to be actually displayed on the display unit 20 out of the plural characteristic image data stored on the RAM 16. There are various methods of selecting display images. All the methods belong to the technical scope of the invention. Several methods will be explained below. A first method is a method of selecting and displaying latest one or plural images of image data of the characteristic images written in the RAM 16. A second method is a method of selecting and displaying oldest one or plural images. A third method is a method of selecting and displaying one or plural images between the latest one and the oldest one. A fourth method is a method of selecting and displaying one or plural characteristic images designated by a user via the operation unit 22 out of the characteristic images.

A fifth method is a method of selecting and displaying, when characteristic images derive from key images, one or plural characteristic images related to a function of the key images. For example, it is possible that the number of times key images corresponding to characteristic images are used for a retrieval function is stored on the storage medium 3 or the like in advance and one or plural images are selected and displayed in order from an image with highest frequency (or lowest frequency). Alternatively, it is also possible that the number of hits in the case in which key images corresponding to characteristic images are used for the retrieval function is stored on the storage medium 30 or the like in advance and one or plural images are selected and displayed in order from an image with a largest number (or smallest number) of hits.

The one or plural characteristic images selected in association with the function as original key images are symbolic images having relatively deep relevance to general images stored on the storage medium 30. Thus, when the characteristic images are displayed, the user can recollect or estimate contents stored on the storage medium 30 more easily. In other words, the user can learn more promptly what is stored on the storage medium and what kind of characteristics the storage medium has.

In step S406, the CPU 17 lays out image data of the selected one or plural characteristic images of the characteristic images written in the RAM 16 in order, then, sends the image data to the display unit IF 21, and causes the display unit 20 to display the image data. Note that, it goes without saying that, if one image is selected, the one image is displayed on an entire surface of the display unit 20 as a layout, and if plural images are selected, all the selected characteristic images displayed appropriately.

In step S407, the CPU 17 judges whether the processing for displaying characteristic images should be finished. For example, when the jog dial of the operation unit 22 is switched to another mode or when power OFF is instructed, the CPU 17 judges that the processing for displaying characteristic images should be finished.

In the above explanation, key images imaged by operating the retrieval button 22B are set as characteristic images directly. However, in the information managing apparatus 100, the retrieval button 22B may be constituted as a characteristic image setting button. In this case, when the shutter button 22A and the characteristic image imaging button 22B are pressed simultaneously, characteristic images are imaged.

When only the shutter button 22A is pressed, general images are imaged. Consequently, characteristic images corresponding to image information stored on the connected storage medium are created.

By adopting the constitution described above, it is possible to show, with a simple constitution, characteristic images to a user to indicate what is stored on the storage medium and what kind of characteristics the storage medium has. The user can recollect or estimate contents of the storage medium easily. As a result, it is possible to provide, in particular, an information managing apparatus that allows the user to find out a desired image from plural or a large number of storage media in short time and easily.

Since connection of a storage medium is set as a trigger for the processing for displaying characteristic images, the user can see characteristic images immediately without performing complicated operation.

Since characteristic images are stored on a storage medium, it is possible to manage the characteristic images and the storage medium together. Thus, when the storage medium is connected to an information managing apparatus different from an information managing apparatus that has created the characteristic images, the user can see the characteristic images, although the characteristic images are not created repeatedly.

In the information managing apparatus having an image retrieval function, it is possible to use key images also as characteristic images. Consequently, processing for displaying characteristic images and processing for creating characteristic images are performed very efficiently. Compared with the case in which the key images and the characteristic images are stored separately, since a storage capacity can be saved, additional cost is required only a little.

Second Embodiment

In a second embodiment of the invention, a method of using images as a retrieval result obtained by executing image retrieval as characteristic images will be explained. Note that the components explained in the first embodiment are denoted by the identical reference numerals and signs to simplify the explanation.

Figure 5:
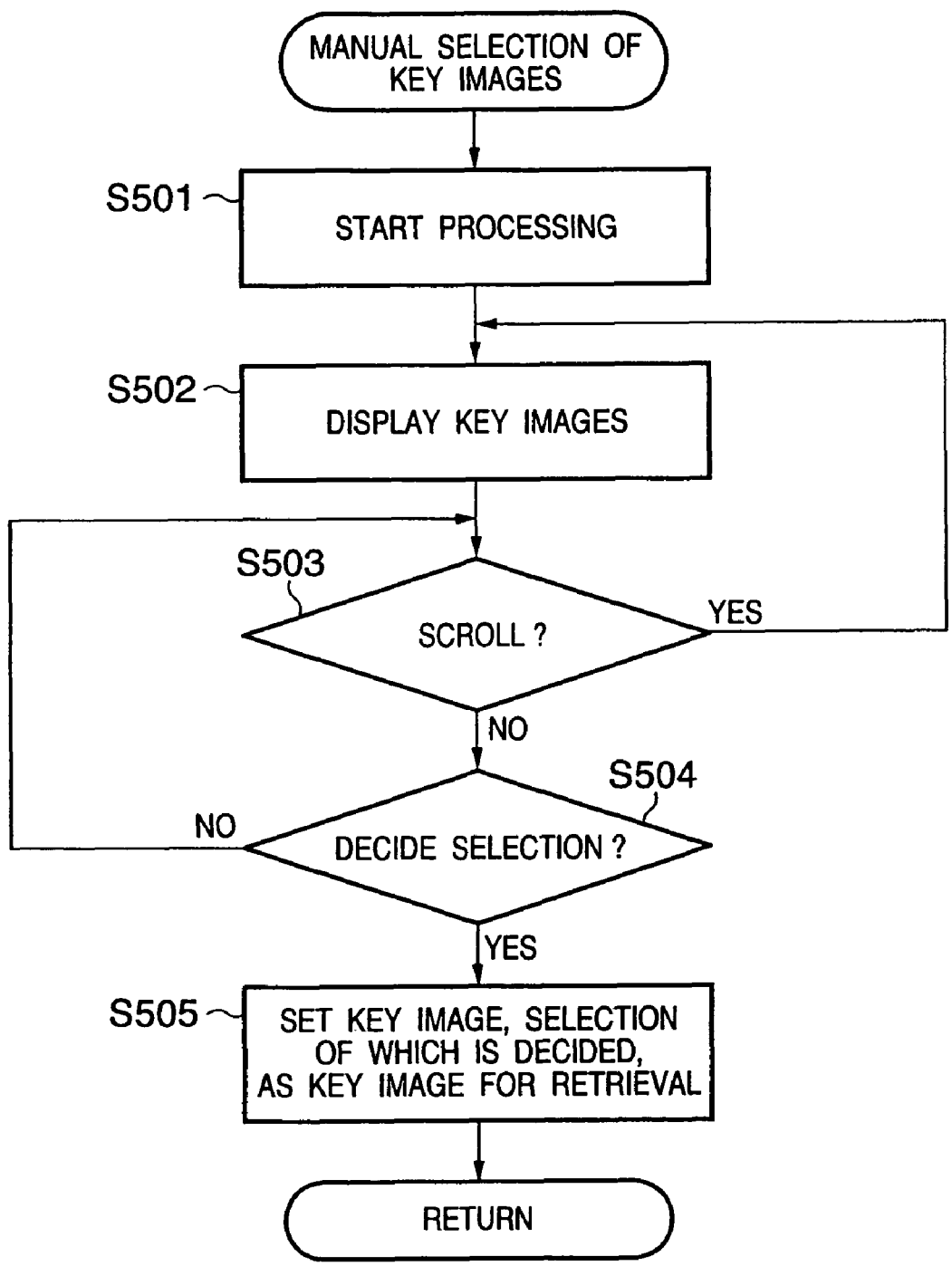
FIG. 5 is an exemplary flowchart concerning processing for setting key images according to an embodiment.

FIG. 5 is an exemplary flowchart concerning processing for setting key images according to this embodiment. In this embodiment, a user sets key images manually. First, when the user operates the display & file operation related button 22E to select processing for selecting key images, interrupt is generated from the operation unit IF 23. The CPU 17 detects the interrupt and starts the processing for selecting key images.

In step S501, the CPU 17 executes interrupt clear or the like. In step S502, the CPU 17 reads out all key images in order from the storage medium 30 and writes the key images in the RAM 16 via the RAM controller 15. When all image data of the key images are stored on the RAM 16, the CPU 17 reads out the image data in order and sends the read-out image data to the display unit IF 21 to thereby display the key images on the display unit 20 as thumbnails. The user can select one key image out of the plural key images displayed as thumbnails with an arrow key included in the display & file operation related button 22E. The CPU 17 highlights the selected key image according to, for example, color reversal.

In step S503, the CPU 17 performs polling through the operation unit IF 23 to detect whether an instruction for scroll is inputted by an arrow key in the operation unit 22. If the instruction for scroll is inputted, the CPU 17 instructs the display unit IF 21 to perform scroll, color reversal, or the like of the image. In other words, the CPU 17 returns to step S502 to display a thumbnail of the next key image.

In step S504, the CPU 17 judges whether decision of selection of the key image is instructed. For example, the CPU 17 judges whether a decision button included in the display and file operation related button 22E is pressed. If the decision of selection is instructed, the CPU 17 proceeds to step S505. If the decision of selection is not instructed, the CPU 17 returns to step S503.

In step S505, the CPU 17 sets the selected key image as an image for retrieval. For example, the CPU 17 writes the key image, selection of which is decided, in a specific area of the RAM 15, the ROM 17, or the storage medium 30. Consequently, in executing retrieval next time, the search engine 50 reads out this key image from the specific area and uses the key image. Thereafter, the CPU 17 ends the operation for selecting key images and returns to the original mode.

Figure 6:
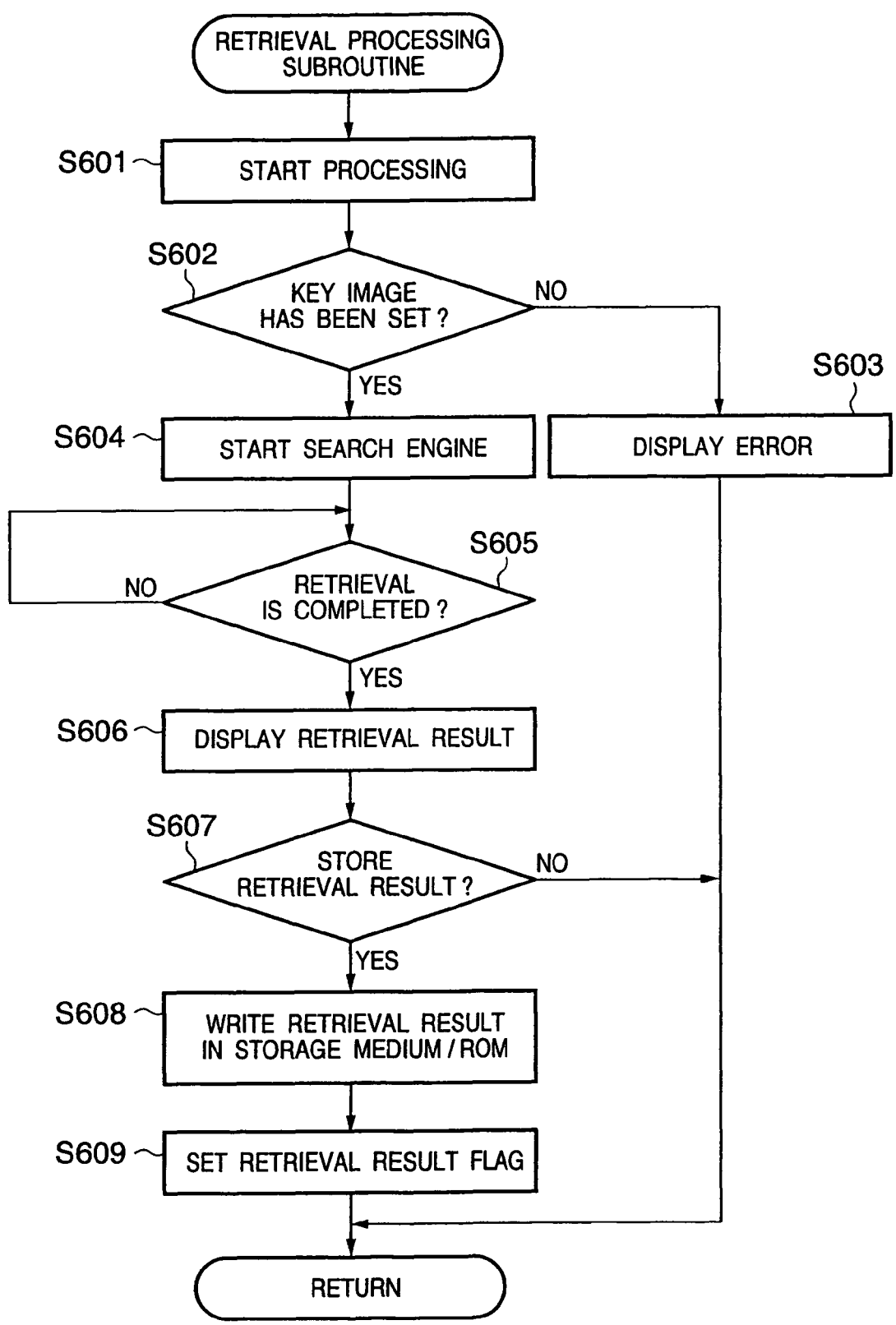
FIG. 6 is an exemplary flowchart concerning image retrieval processing according to the embodiment.

FIG. 6 is an exemplary flowchart concerning processing for image retrieval according to this embodiment. This processing is executed when a user presses the retrieval button 22B in the reproduction mode. In other words, when the retrieval button 22B is pressed in the reproduction mode, interrupt is generated by the operation unit IF 23 and sent to the CPU 17. In response to this interrupt, the CPU 17 starts processing for image retrieval.

In step S601, the CPU 17 performs interrupt clear or the like. In step S602, the CPU 17 judges whether a key image for retrieval has been set. For example, if a key image is stored on the specific area described above, the CPU 17 judges that a key image for retrieval has been set. If the key image has not been set, the CPU 17 proceeds to step S603. The CPU 17 sends an instruction to the display unit IF 21, causes the display unit 20 to display an indication that a key image for retrieval has not been set, and ends a retrieval operation.

In step S604, the CPU 17 starts the search engine 50. The search engine 50 reads out general images in the storage medium 30 sequentially according to a Direct Memory Access (DMA) operation without the intervention of the CPU 17 and transfers the general images to the RAM 16. The search engine 50 compares the images read out by the DMA operation and the set key image to thereby judge whether both the images are related to each other (e.g., whether both the images are similar). When a similar image is retrieved, the search engine 50 stores the image in another area (e.g., a retrieval result storage area) in the RAM 16.

In step S605, the CPU 17 judges whether image retrieval is completed for the general images in the storage medium 30. For example, the CPU 17 detects an end of the retrieval operation of the search engine 50 according to polling or interrupt. If the retrieval operation ends, the CPU 17 proceeds to step S606.

In step S606, the CPU 17 sends image data of one or plural images as a retrieval result stored on the retrieval result storage area in the RAM 16 to the display unit IF 31 and displays the image data on the display unit 20 as thumbnails or in a usual display form.

In step S607, the CPU 17 judges whether the retrieval result should be stored. There are several methods for the judgment. For example, when a setting item representing whether a retrieval result should be stored is provided in environment setting items of the information managing apparatus stored on the ROM 18, the CPU 17 can reads the setting item to judge whether the retrieval result should be stored. On the other hand, on a screen at the time when a retrieval result is displayed or on a screen after that, the CPU 17 may display a message, which inquires a user whether the retrieval result should be stored, to the display unit 20 to cause the user to select whether the retrieval result should be stored every time. Step S607 may be omitted by fixing the setting for whether a retrieval result is always stored or not stored. Note that, when the retrieval result is not stored, the CPU 17 ends the retrieval operation directly.

On the other hand, when the retrieval result is stored, in step S608, the CPU 17 reads out the retrieval result from the RAM 16 and writes the retrieval result in the storage medium 30 or the ROM 18. Note that the retrieval result may be stored on a specific area of the RAM 16. The storage medium 30, the ROM 18, or the RAM 16, in which the retrieval result is written, may be fixed or may be determined according to environment setting items set in advance. Alternatively, the CPU 17 may store the retrieval result in storage unit determined by the user every time. The retrieval result may be stored on two or more storage unit redundantly.

In step S609, the CPU 17 writes a flag concerning presence or absence of a retrieval result (e.g., information of 1 bit consisting of 0 or 1, etc.) in the storage medium 30. In addition, storage location information indicating where the retrieval result is stored (a section where the retrieval result is stores, address information, etc.) may also be written according to circumstances. Thereafter, the CPU 17 ends the retrieval operation.

Figure 7:
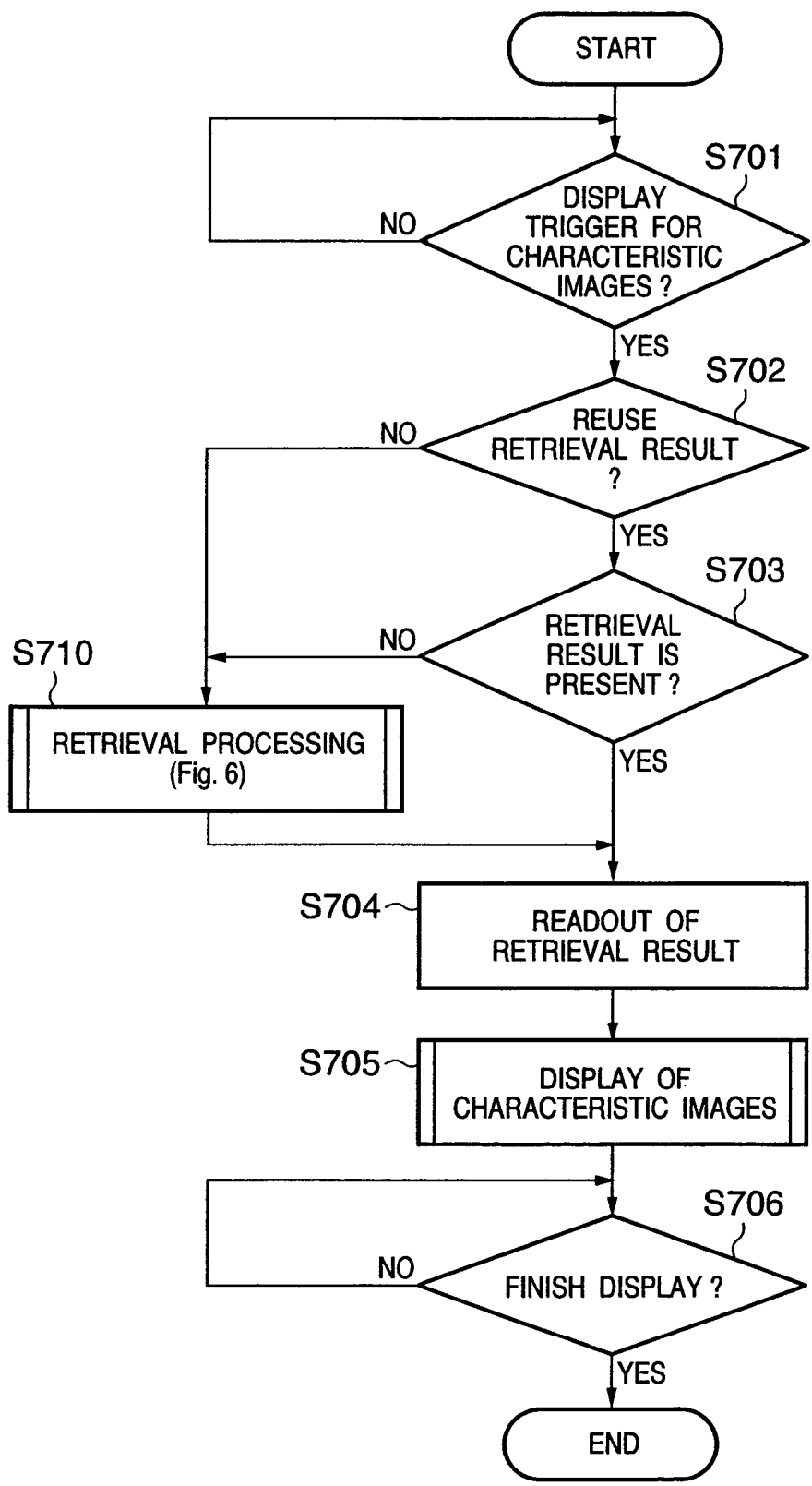
FIG. 7 is an exemplary flowchart concerning processing for displaying characteristic images according to the embodiment.

FIG. 7 is an exemplary flowchart concerning processing for displaying characteristic images according to this embodiment. In this flowchart, one or plural images of images, which appear as a retrieval result when image retrieval is applied to the target storage medium 30, are set as characteristic images of the storage medium.

Note that, as described above, the characteristic image unit a characteristic image that symbolizes contents stored on the storage medium 30. It is highly likely that the images appearing as a retrieval result in this embodiment are images required by a user among a certain group of images in the storage medium 30. Thus, the images appearing as a retrieval result would be suitable as characteristic images in the storage medium 30. Note that it goes without saying that showing a retrieval result at the time when image retrieval is performed is equivalent to creation of characteristic images for image information stored on the connected storage medium 30. In other words, processing for storing images as a retrieval result is equivalent to processing for setting images as a retrieval result as characteristic images.

In step S701, the CPU 17 judges whether a display trigger for characteristic images has occurred. Details of this step are as explained in step S401.

In step S702, the CPU 17 judges whether the information managing apparatus 100 is in a mode for reusing a retrieval result in the past. There are several methods of judging whether a retrieval result in the past should be reused. For example, it is possible to judge whether a retrieval result in the past should be reused using the setting for storage of a retrieval result described above. For example, when a setting item concerning whether a retrieval result should be stored is stored on the ROM 18 in advance, the CPU 17 reads this setting item. When the setting item is set as "store a retrieval result", the CPU 17 can judge that a retrieval result is reused. On the other hand, the CPU 17 may cause the display unit 20 to display a message inquiring whether a retrieval result should be reused to cause the user to select whether a retrieval result should be reused. Note that, when a retrieval result is stored on any storage unit, the retrieval result may always be reused. In this case, steps S702 and S703 are unnecessary.

When the information managing apparatus 100 is in the mode for reusing a retrieval result, the CPU 17 proceeds to step S703. If it is judged that a retrieval result in the past is not reused, the CPU 17 proceeds to step S710 and executes new processing for image retrieval.

In step S703, the CPU 17 checks whether a retrieval result in the past is present. It is possible to check whether a retrieval result is present as described below. As shown in the flowchart in FIG. 6, if a retrieval result is stored on advance, information concerning presence or absence of a retrieval result (0 or 1, information of 1 bit, etc.) is written in a predetermined area of the storage medium 30 (S609). Thus, it is possible to recognize presence or absence of a retrieval result by referring to the information. When it is judged that no retrieval result is present, the CPU 17 proceeds to step S710 and executes a subroutine of the processing for image retrieval (FIG. 6).

On the other hand, when some retrieval result is present, the CPU 17 proceeds to step S704. The CPU 17 accesses the storage medium 30, the ROM 18, or the like, in which the retrieval result in the past is stored, to thereby read out the retrieval result in the past to the RAM 16.

In step S705, the CPU 17 sends image data of one or plural images as a retrieval result (characteristic images) to the display unit IF 31 and displays the image data on the display unit 20 in a thumbnail display form or a usual display form for displaying images one by one. In this embodiment, the images as a retrieval result are nothing but characteristic images of the storage medium 30. Therefore, in the information managing apparatus 100, it is possible to display characteristic images with switching to the reproduction mode or the like as a trigger. Note that, concerning this display processing, steps S403 to S407 may be executed.

In step S706, the CPU 17 judges whether the processing for displaying characteristic images should be finished. For example, when an end instruction is inputted in the operation unit 22, the CPU 17 judges that the processing for displaying characteristic images should be finished.

As explained above, according to the second embodiment, a retrieval result acquired by the processing for image retrieval is displayed on the display unit 20 as characteristic image of the storage medium 30. Thus, the user can recollect or estimate contents stored on the storage medium 30 easily. In other words, the user can learn more promptly what is stored on the storage medium and what kind of characteristics the storage medium has. Thus, the invention according to this embodiment is very useful. As a result, it is possible to provide an information managing apparatus that makes it possible to find out a desired image from plural (in particular, a large number of) storage media in short time and easily.

The user can see characteristic images immediately after connecting the storage medium without performing complicated operation.

If retrieval result in the past is stored, it is possible to display characteristic images promptly without performing an image retrieval operation again. This is very useful for the user.

Third Embodiment

In the third embodiment, images as an analysis result (analysis images) obtained by analyzing what is included in images in the storage medium 30 are set as characteristic images of the storage medium. Note that, as described above, the characteristic image is a characteristic image symbolizing contents stored on the storage medium. The analysis images in this embodiment are images obtained by analyzing what kind of images are included in all or a part of a group of images in the storage medium 30. Thus, the analysis images would be suitable as characteristic images in the storage medium 30.

In addition, analyzing what is included in images in the storage medium 30 to show analyzes images of the images is equivalent to creation of characteristic images concerning image information stored on the storage medium 30 connected to the information managing apparatus 100.

Figure 8:
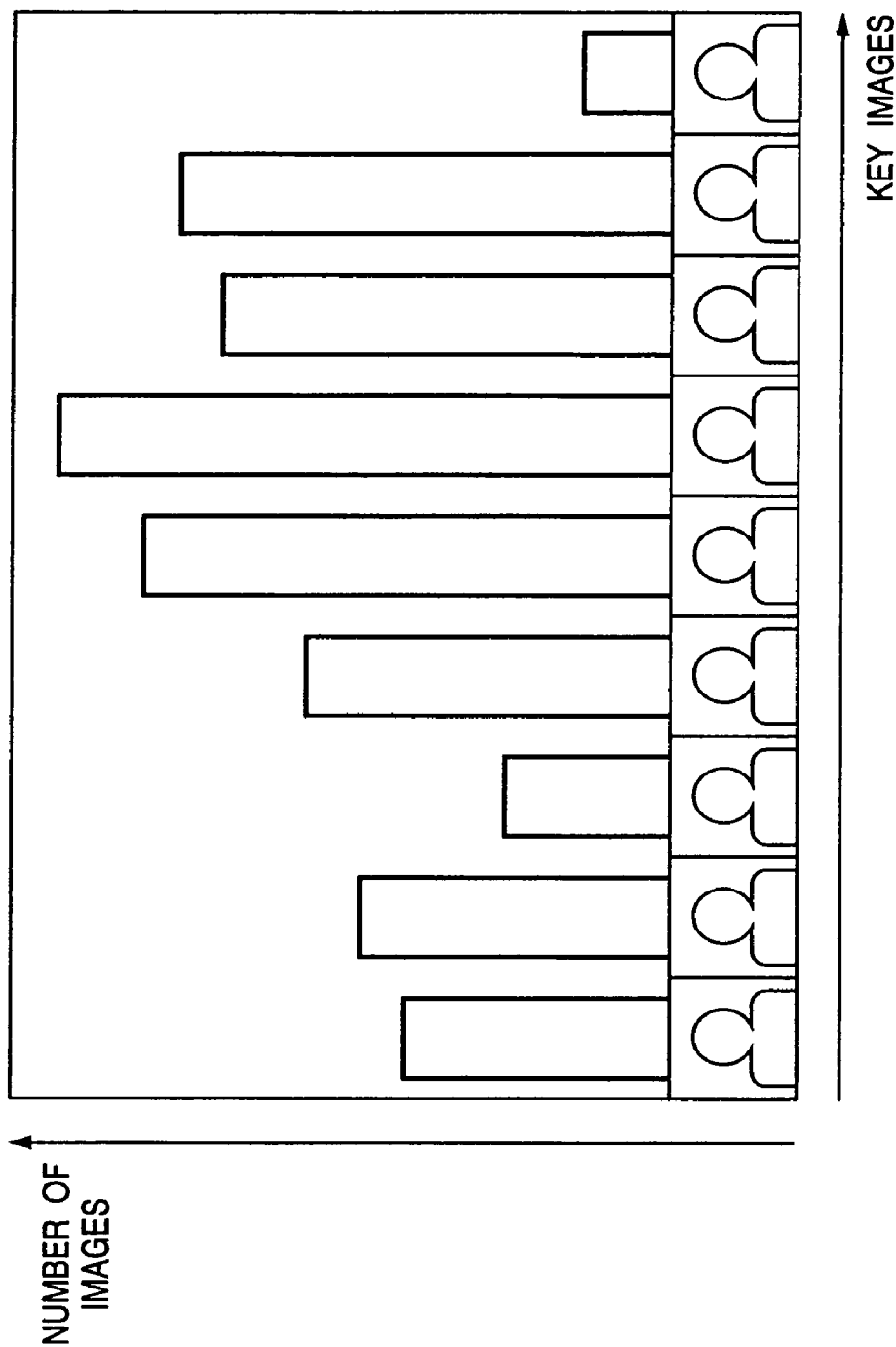
FIGS. 8 to 11 are diagrams showing examples of analysis images obtained by analyzing what kind of image is included in a storage medium.

FIGS. 8 to 11 are diagrams showing examples of analysis images obtained by analyzing what kind of images are included in a storage medium. In particular, FIG. 8 is a diagram of number-of-images analysis images that indicate what kind of images and how many images are included in the storage medium 30. In the figure, on an abscissa, plural key images such as face images of plural people suitable for retrieving images in the storage medium 30 are arranged. On an ordinate, the number of images similar to the key images or images including face images of people as the key images is arranged as bar graphs. In this way, concerning the images included in the storage medium 30, the number of images (images including face images of people) similar to key images (face images of the people, etc.) is calculated and diagrammatized as bar graphs. Consequently, the CPU 17 creates number-of-images analysis images of the storage medium 30.

Figure 9:
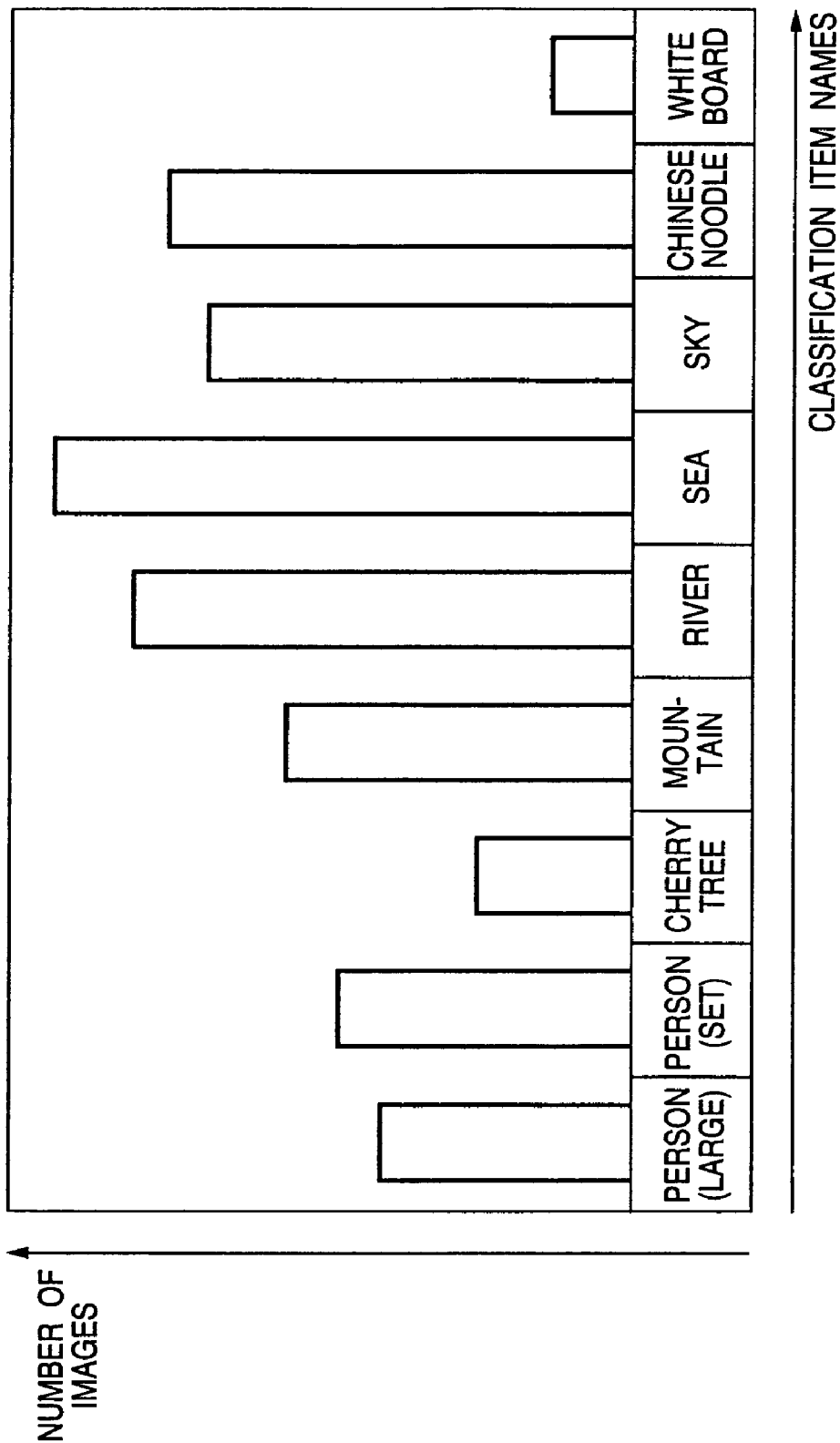

Note that the key images (face images of people, etc.) are arranged on the abscissa in the example described above. However, for example, other items may be arranged on the abscissa. FIG. 9 is a diagram showing an example in which classification item names or the like are arrange on the abscissa. Classification items such as "person (large), person (set), cherry tree, mountain, river, sea, sky, Chinese noodle, and white board" are shown as examples. In this case, for example, if sample images corresponding to these items are stored and held in the ROM 18 of the information managing apparatus 100 as a key image, it is possible to realize number-of-images analysis images using these classification item names or the like in the same method as the number-of-images analysis images using key images.

Figure 10:
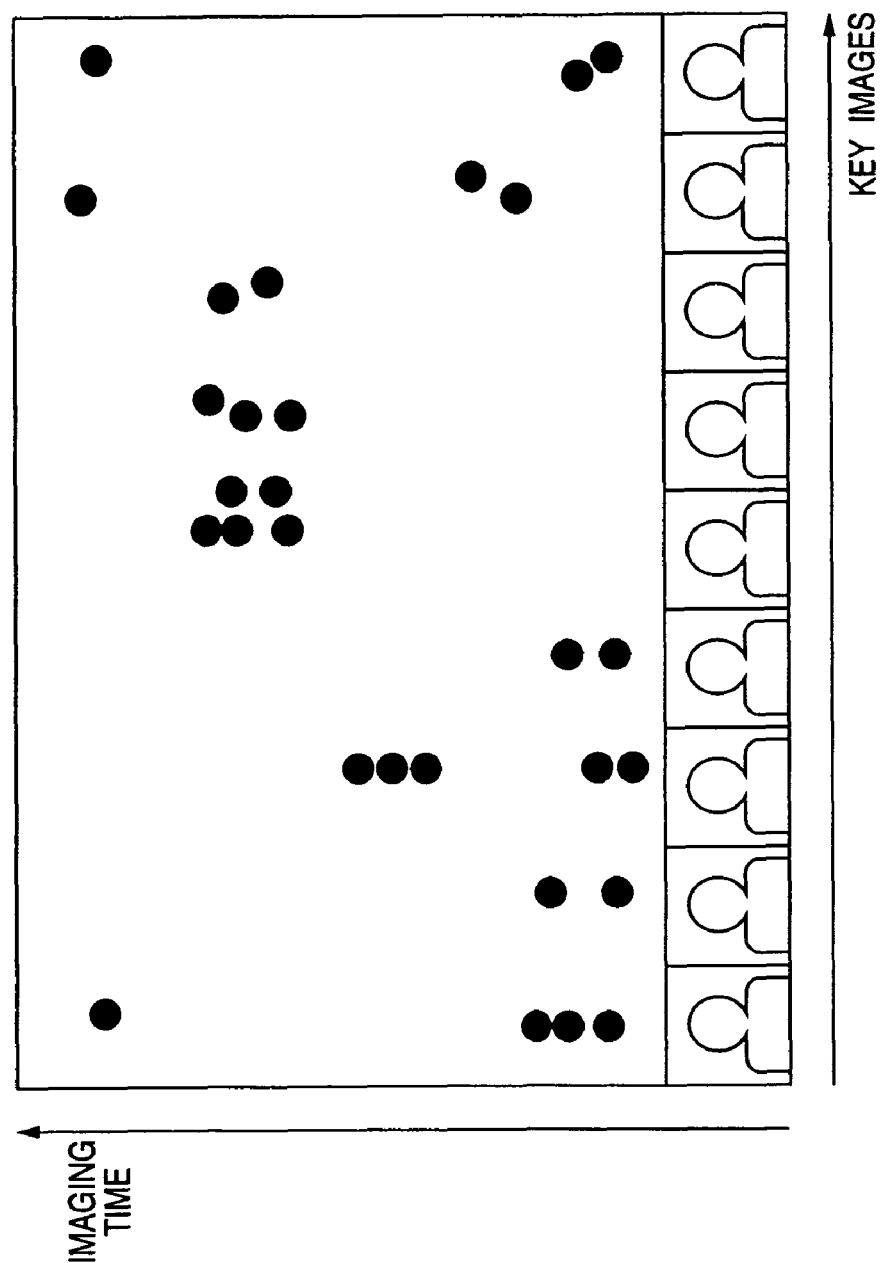

FIG. 10 is a diagram showing an example of other analysis images. FIG. 10 shows time-series analysis images indicating what kind of images are imaged and when the images are imaged on the storage medium 30. In FIG. 10, key images such as face images of plural people suitable for retrieving images in the storage medium 30 are arranged on an abscissa. Creation time of images (files) stored on the storage medium 30 such as so-called imaging time is arranged on an ordinate. In this way, the CPU 17 plots imaging time of images similar to key images (face images of people, etc.) with respect to the images included in the storage medium 30 to thereby create a chart of a distribution in time series of imaging time.

Figure 11:
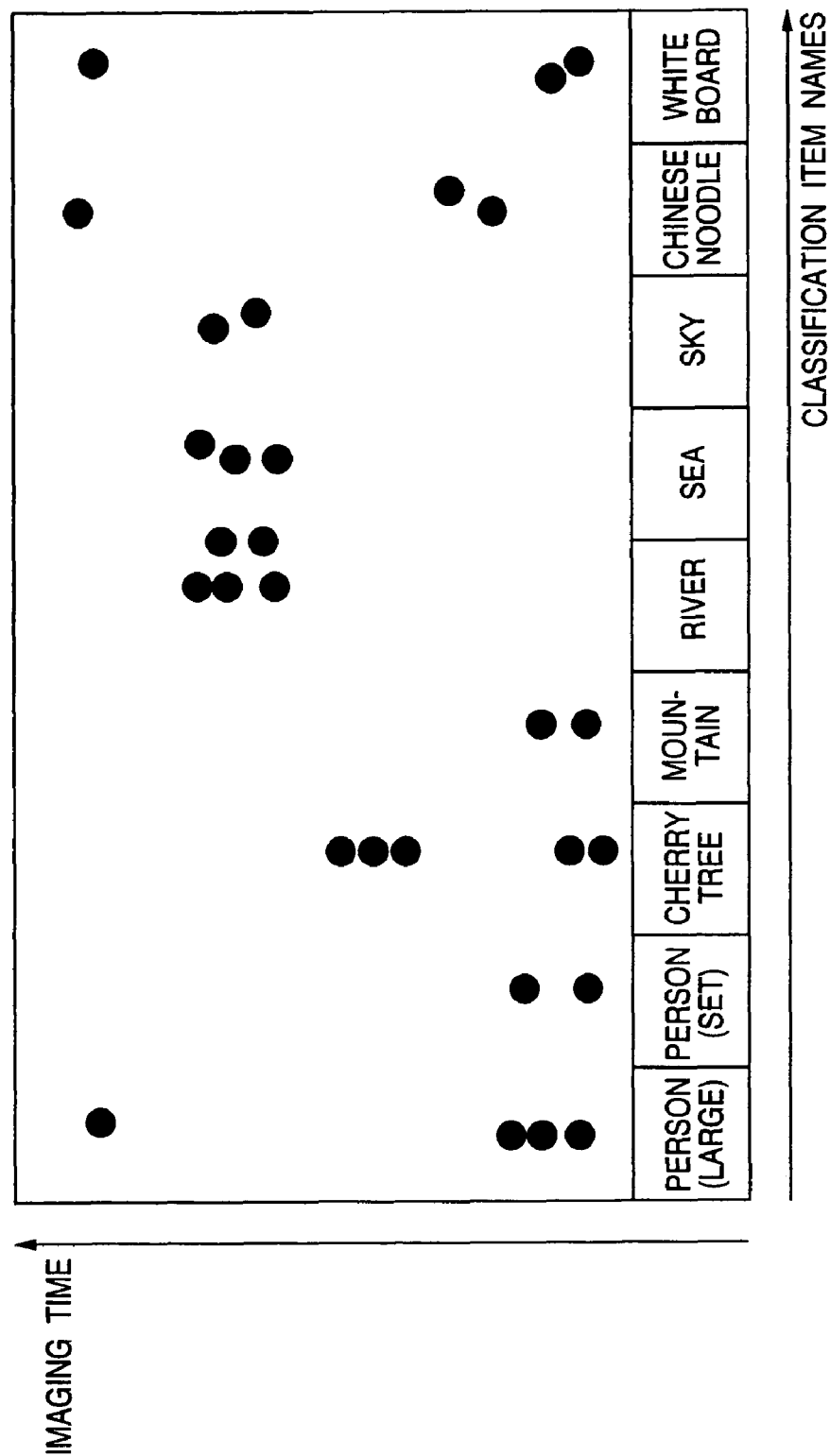

Note that, in this case, classification item names or the like may be adopted on the abscissa in the same manner. An example of the classification item names is shown in FIG. 11. It is possible to realize the time-series analysis images using the classification item names or the like in the same manner by using the same creation method as the number-of-images analysis images that are created using the classification item names or the like.

As explained above, analysis images are an example of characteristic images and the analysis images include number-of-images analysis images and time-series analysis images as examples. However, the invention is not always limited to these specific examples. Even if a method of plotting items on the ordinate and the abscissa is changed in various ways, the method belongs to the technical scope of the invention.

Subsequently, an operation in the case in which such analysis images are used as characteristic images will be explained.

In the third embodiment, components already explained are denoted by the identical reference numerals and signs to simplify the explanation.

Figure 12:
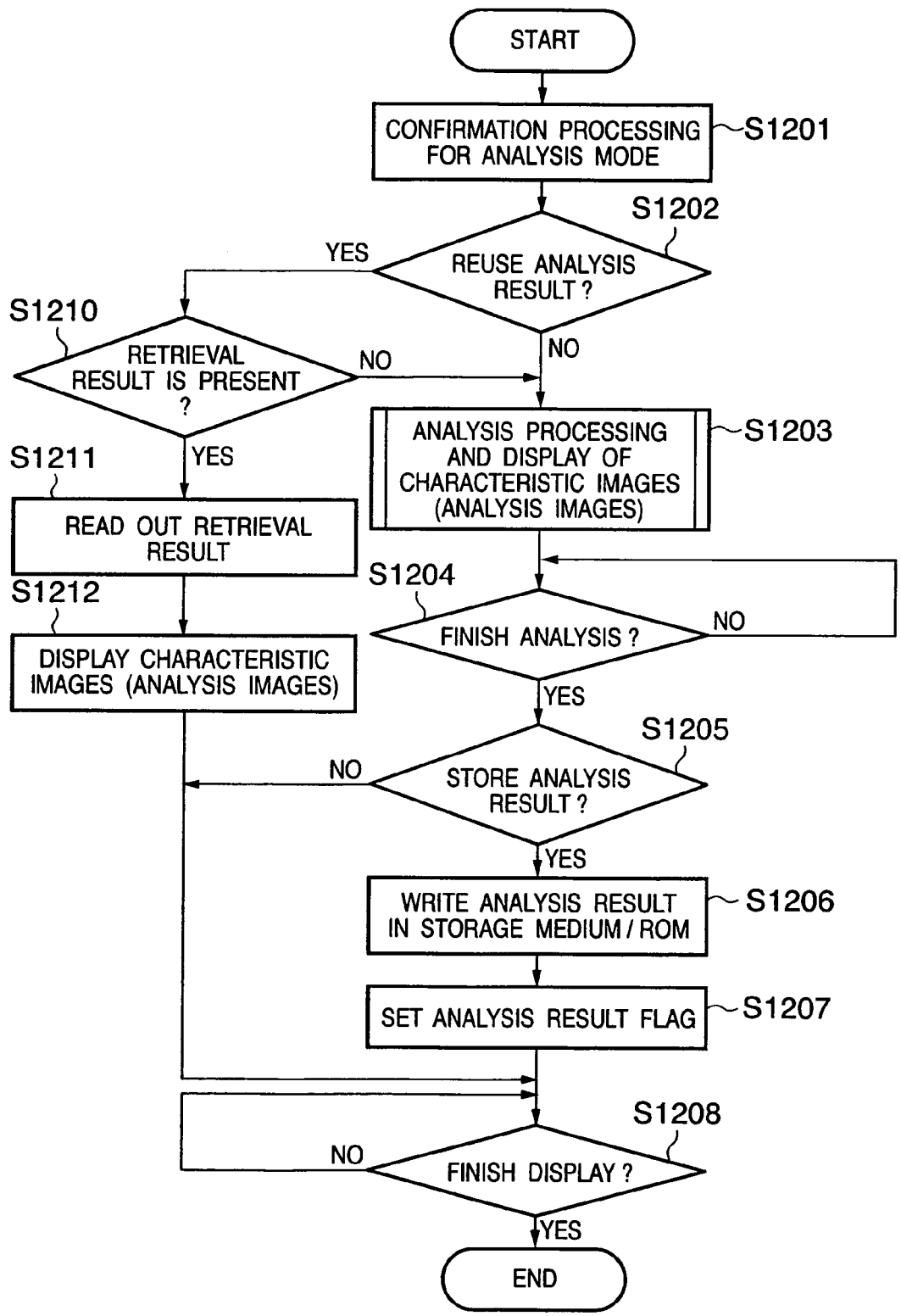
FIG. 12 is a flowchart showing an operation of an information managing apparatus according to an embodiment.

FIG. 12 is a flowchart showing an operation of an information managing apparatus according to the third embodiment. When a user operates the jog dial for mode setting 22C to switch (shift) the imaging mode to the reproduction mode, when the power supply switch 22D is turned on in a state in which the jog dial for mode setting 22C is set in the reproduction mode, when power supply is simply applied to the information managing apparatus, or when the storage medium 30 is connected, the CPU 17 executes processing of this flowchart with that as a trigger.

In step S1201, the CPU 17 executes processing for confirming and determining an analysis mode. For example, the CPU 17 determines whether the number-of-images analysis shown in FIGS. 8 and 9 is executed, the time-series analysis shown in FIGS. 10 and 11 is executed, or other analyses are executed. Moreover, a detailed display form may be determined. For, it is determined whether key images are plotted or classification item names are plotted on an abscissa. In determining the analysis mode, the CPU 17 may cause a user to determine the analysis mode using the operation unit 22 every time an analysis operation is performed. However, in the invention, any method of determination may be adopted. For example, in this embodiment, it is assumed that an item for setting an analysis mode to be used is present as one of environment setting items of the information managing apparatus 100 and contents of the setting are stored on the ROM 18 in advance. The CPU 17 reads and confirms the setting contents to thereby determine which analysis mode should be adopted. Step S1201 may be omitted by fixing an analysis method to only one type.

In step S1202, the CPU 17 judges whether an analysis result in the past is reused (S303). There are several methods of judging whether an analysis result in the past is reused. For example, a setting item for indicating whether an analysis result should be stored is provided, contents of the setting are stored on the ROM 18 in advance, and the CPU 17 reads and confirms the contents of the setting. Consequently, the CPU 17 can judge whether an analysis result should be stored. Alternatively, on a screen at the time when an analysis result is displayed or on a screen after that, a message inquiring the user whether the analysis result should be stored is displayed on the display unit 20 to cause the user to select whether the analysis result is stored every time, the CPU 17 may refer to the contents of the setting and execute the judgment. Step S1202 may be omitted by fixing the setting for whether an analysis result is always stored or are not always stored.

When the analysis result in the past is not reused, the CPU 17 proceeds to step S1203 and starts a new analysis operation. The CPU 17 displays characteristic images, which are an obtained analysis result, on the display unit 20. Details of this step will be described later with reference to, for example, flowcharts in FIGS. 13 and 14.

In step S1204, the CPU 17 judges whether a series of analysis operations and a display operation for characteristic images, which is an analysis result, end. For example, the CPU 17 detects the end according to polling or interrupt.

When the analysis operation ends, the CPU 17 proceeds to step S1205 and judges whether the analysis result should be stored. There are several methods for the judgment. For example, a setting item indicating whether an analysis result should be stored is provided as one of environment setting items of the information managing apparatus 100 and contents of the setting is stored on the ROM 18. The CPU 17 reads the contents of the setting and performs the judgment according to the contents of the setting. Alternatively, on a screen at the time when an analysis result is displayed or on a screen after that, a message inquiring the user whether the analysis result should be stored may be displayed on the display unit 20 to cause the user to select whether the analysis result is stored every time. The CPU 17 can perform the judgment by referring to results of the setting. Step S1205 may be omitted by fixing the setting for whether an analysis result is always stored or is not always stored.

When the analysis result is not stored, the CPU 17 proceeds to step S1208 and ends the processing of this flowchart awaiting end of display is instructed from the operation unit 22.

On the other hand, when the analysis result is stored, the CPU 17 proceeds to step S1206 and stores the analysis result. For example, the CPU 17 reads out the analysis result from the RAM 16 and writes the analysis result in the storage medium 30 or the ROM 18. Alternatively, the CPU 17 may store the analysis result in a specific area of the RAM 16. Note that storage unit in which the analysis result is stored may be fixed to one of the storage medium 30, the ROM 18, and the like or may be determined in accordance with contents of setting set in advance. Alternatively, the CPU 17 may cause the user to determine storage unit every time. In addition, the CPU 17 may store the analysis result in plural storage unit redundantly.

In step S1207, the CPU 17 writes information on presence or absence of an analysis result (0 or 1, information of 1 bit, etc.) in a predetermined area of the storage medium 30. In addition, storage location information indicating where the analysis result is stored (a section where the analysis result is stores, address information, etc.) may also be written according to circumstances.

In this embodiment, an analysis result is characteristic images of the storage medium 30. Thus, in the information managing apparatus 100, an analysis result is created with switching to the reproduction mode or the like as a trigger and images of the analysis result are displayed as characteristic images. Thereafter, the CPU 17 proceeds to step S1208 and ends an analysis operation awaiting input of an end instruction.

On the other hand, when it is judged in step S1202 that an analysis result in the past is not reused, the CPU 17 proceeds to step S1210.

In step S1210, the CPU 17 checks whether an analysis result is stored. It is possible to judge whether an analysis result is present as described below. For example, as explained in step S1207, when information concerning presence or absence of an analysis result (0 or 1, information of 1 bit, etc.) is written in a predetermined area of the storage medium 30, the CPU 17 can recognize presence or absence of an analysis result in the past by referring to the information. When no analysis result is present, the CPU 17 proceeds to step S1203 and executes new analysis processing.

On the other hand, when an analysis result is present, the CPU 17 proceeds to step S1211. The CPU 17 reads out an analysis result in the past from the storage unit (the storage medium 30, the ROM 18, etc.), in which the analysis result in the past is stored, and writes the analysis result in the RAM 16.

In step S1212, the CPU 17 sends characteristic images, which is the analysis result in the past, to the display unit IF 31 and displays the characteristic image on the display unit 20. In this way, in this embodiment, analysis images are created with switching to the reproduction mode or the like as a trigger and the created analysis images are displayed as characteristic images. Thereafter, the CPU 17 proceeds to step S1208 and ends the analysis operation awaiting an end instruction to end the analysis operation.

Figure 13:
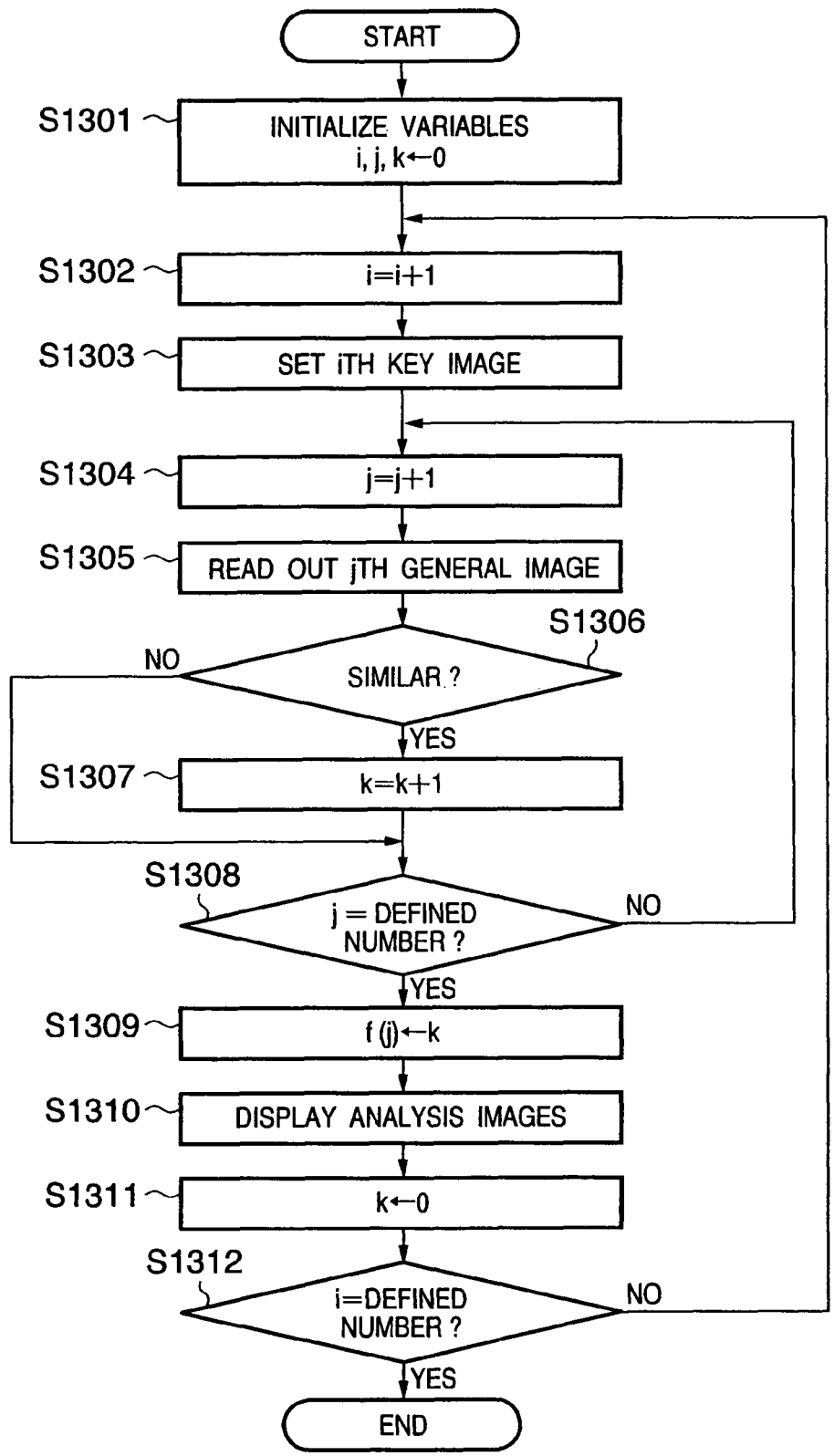
FIG. 13 is an exemplary flowchart of an operation for analyzing the number of images according to the embodiment.

FIG. 13 is an exemplary flowchart of a number-of-images analysis operation according to this embodiment. First, in the case of number-of-images analysis, in step S1301, the CPU 17 initializes respective variables. In this example, three variables i, j, and k are used. The variable i is a variable for counting key images or classification items. Note that facial images of people or the like may be adopted or sample images of classification items (including facial images of the people) may be adopted as the key images. The variable j is a variable for counting analysis object general images stored on the storage medium 30. The variable k is a variable for counting images similar to key images set at present. After starting the analysis operation, first, the CPU 17 clears the variables i, j, and k to zero.

In step S1302, the CPU 17 increments the variable i. In step S1303, the CPU 17 sets an ith key image in the RAM 16. For example, the CPU 17 reads out a key image from the storage medium 30 (or the ROM 18, etc.) and transfers the key image to the RAM 16. The search engine 50 or the like, which carries out analysis processing, may execute this processing according to Direct Memory Access (DMA) without the intervention of the CPU 17.

In step S1304, the CPU 17 increments the variable j. In step S1305, the CPU 17 reads out a jth analysis object general image from the storage medium 30 (or the ROM 18, etc.) and transfers the analysis object general image to the RAM 16. The search engine 50 or the like, which carries out analysis processing, may execute this processing according to Direct Memory Access (DMA) without the intervention of the CPU 17.

In step S1306, the CPU 17 judges whether the ith key image and the jth general image are similar. When the ith key image and the jth general image are not similar, the CPU 17 proceeds to step S1308. When the ith key image and the jth general image are similar, the CPU proceeds to step S1307. It is possible to use a publicly-known image retrieval technique (an image recognition technique, a similar image judgment technique, or the like) for this judgment on similarity.

In step S1307, the CPU 17 increments the variable k. Consequently, the CPU 17 counts the number of similar images. In step S1308, the CPU 17 judges whether the judgment on similarity for a defined number of values of the variable j has ended. In other words, the CPU 17 judges whether the judgment on similarity for the ith key image has ended for all the general images stored on the storage medium 30. When the judgment on similarity has not ended, the CPU 17 returns to step S1304 and repeats steps S1305 to S1308 while incrementing a value of j. Consequently, the CPU 17 executes the judgment on similarity for all the general images stored on the storage medium 30.

When the judgment on similarity has ended for the defined number of values of j, the CPU 17 proceeds to step S1309. The CPU 17 writes a value of k in a result value f(i) for the ith key image. In other words, a value of k means the number of general images similar to the ith key image (including facial images of people).

In step S1301, the CPU 17 creates analysis images and causes the display unit 20 to display the analysis images. For example, the CPU 17 creates an analysis result image by plotting the values of i and f(i) in a form of abscissa to ordinate. Consequently, it is possible to render and display analysis images as i f(i).

In step S1311, the CPU 17 clears a value of k to zero. In step S1312, the CPU 17 judges whether analysis processing has ended for a defined number of values of i. In other words, the CPU 17 judges whether the analysis processing has ended for all key images. If the analysis processing has not ended for all the key images, the CPU 17 returns to step S1302 and repeats steps S1303 to S1312 while incrementing a value of i. When the analysis processing has ended for the defined number of values of i, the CPU 17 ends the analysis processing. Consequently, the number of similar images or the like with respect to key images or the like are diagrammatized and displayed.

Figure 14:
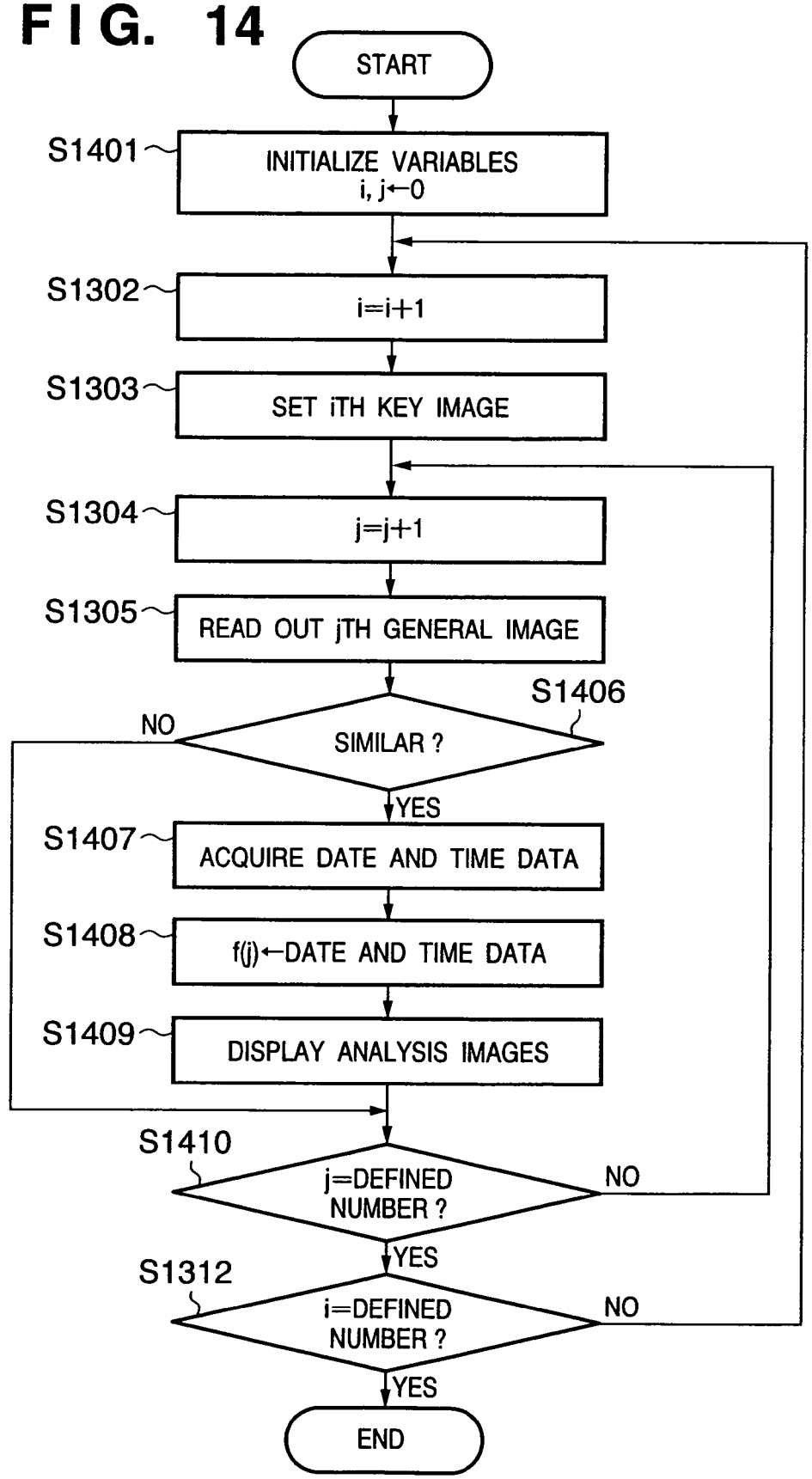
FIG. 14 is an exemplary flowchart of a time-series analysis operation according to the embodiment.

FIG. 14 is an exemplary flowchart of a time-series analysis operation according to this embodiment. Note that components already explained are denoted by the identical reference numerals and signs to omit explanations of the components.

In step S1401, the CPU 17 initializes i and k. Thereafter, after executing steps S1302 to S1305, the CPU 17 proceeds to step S1406.

In step S1406, the CPU 17 performs the same judgment on similarity as step S1306. When the ith key image and the jth general image are not similar, the CPU 17 proceeds to step S1410. When the ith key image and the jth general image are similar, the CPU proceeds to step S1407.

In step S1407, the CPU 17 reads out data of date and time from a file of a general image judged as similar. In step S1408, the CPU 17 writes the read-out data of date and time in a function f(i).

In step S1409, the CPU 17 creates analysis images and displays the analysis images. For example, the CPU 17 arranges an ith key image on an abscissa and arranges an imaging date of an image similar to the ith key image on an ordinate. In other words, analysis images shown in FIGS. 10 and 11 are created and displayed. Thereafter, in step S1410, the CPU 17 judges whether analysis processing has ended for all general images. If the analysis processing has ended for all the general images, the CPU 17 proceeds to step S1312. If the analysis processing has not ended for all the general images, the CPU 17 returns to step S1304.

Consequently, f(i) (date and time of similar images) for an ith key image (or a sample image for a classification item) are superimposed in order to continue rendering and display for all the variables i and j.

As explained above, in the third embodiment, an analysis result of the storage medium 30 is displayed on the display unit 20 as characteristic images. Thus, a user can recollect or estimate contents of the storage medium 30 more easily. In addition, it is possible to learn more promptly what is stored on the storage medium and what kind of characteristics the storage medium has. Thus, the invention according to this embodiment is very useful.

According to this embodiment, an information managing apparatus, which makes it possible to find out a desired image from plural (in particular, a large number of) storage media in short time and easily, is provided.

A user can see characteristic images immediately after connecting the storage medium without performing complicated operation.

If an analysis result in the past is stored, it is possible to display characteristic images promptly without performing an analysis operation again. Thus, the invention is very useful.

Other Embodiments

Various embodiments have been explained. However, further applications are conceivable. For example, the second embodiment, in which images as a retrieval result are used as characteristic images, may be modified such that the CPU 17 stores history data in the ROM 18 every time an image retrieval operation is performed. The history data includes the number of hits for each key image and the number of hits for each general image. In displaying the characteristic images, a general image, which was hit most frequently (or least frequently) in the past, may be displayed as a characteristic image. Alternatively, plural general images may be displayed as characteristic images in order from one with highest frequency (or lowest frequency) of hit out of images hit in the past. In particular, if the general images are displayed from one with largest number of hits, since more familiar images or the like appear, a user can recollect or estimate contents of the storage medium more easily.

The same idea can be applied to the first embodiment in which key images are used as characteristic images. For example, in displaying characteristic images as a retrieval result, key images related to retrieval, in which a large number of (or a small number of) general images were hit in the past, may be displayed as characteristic images. Alternatively, key images related to retrieval, in which a large number of (or a small number of) general images were hit in the past, may be displayed as characteristic images in order from one with a largest (or smallest) number of hits. In addition, key images may be selected as characteristic images according to the number of times these ideas are used for retrieval.

By adopting such a constitution, since more effective or more familiar key images or the like appear, the user can recollect or estimate contents of a storage medium more easily.

In the second embodiment, it is also possible that plural key images are set, detailed retrieval conditions are created according to logical combinations such as AND and OR of these key images to execute retrieval, and an obtained retrieval result is used as characteristic images. By defining retrieval conditions in detail in this way, it is highly likely that more characteristic images appear in the storage medium 30. Thus, the user can recollect or estimate contents of the storage medium more easily.

In the first to the third embodiments, it is also possible that categories of pictures such as a group picture and a landscape picture are set as retrieval keys to execute retrieval or analysis and key images, images as a retrieval result, or analysis images in that case are displayed as characteristic images in the same manner. Consequently, since characteristic images representing characteristics of contents stored on the storage medium 30 well also appear, the user can recollect or estimate contents of the storage medium easily.

According to the third embodiment, by making full use of the image retrieval technique, it is possible to analyze a tendency concerning what kind of images are stored on the storage medium 30 in a large quantity. If a result of this analysis is applied to the first or the second embodiment as key images, it is also possible to display images as a retrieval result coinciding with the analysis result as further characteristic images. Consequently, since characteristic images representing characteristics in the storage medium 30 well also appear, the user can recollect or estimate contents of the storage medium easily.

On the other hand, concerning a method of displaying characteristic images, in the first to the third embodiments, when a user operates the jog dial for mode setting 22C to thereby switch (shift) the information managing apparatus from an imaging mode to a reproduction mode, when the power supply switch 22D is turned on in a state in which the jog dial for mode setting 22C is set in the reproduction mode, when simple application of a power supply is detected, or when connection of the storage medium 30 is detected, these are detected as display triggers to display characteristic images. However, characteristic images may always be displayed as long as the information managing apparatus is connected to the power supply. Operation of an arbitrary button (pressing of a button, etc.) in the operation unit 22 may be set as a display trigger. Alternatively, specific operation or the like may be set as a display trigger to display characteristic images.

The respective embodiments may be combined in a range in which the combination is not inconsistent with the invention. For example, the first embodiment and the second embodiment may be combined to display key images and images as a retrieval result as characteristic images simultaneously.

In the respective embodiments, a method of displaying characteristic images may be a thumbnail form or a usual display form for displaying images one by one. Alternatively, other display methods may be adopted.

In the explanations of the respective embodiments, characteristic images are created from the time of detection of a trigger for creation of characteristic images until the time of display of the characteristic images. However, characteristic images may be created at other timing. For example, it is also possible that characteristic images are created according to DMA in the background during other operations, stored on the storage medium 30, the ROM 18, or the RAM 16, and displayed.

The invention is not limited to the examples shown in FIGS. 8 to 11 explained in the third embodiment. For example, analysis images, which are obtained by analyzing a group of images stored on the storage medium 30 with some statistic method or the like, may be set as characteristic images. It goes without saying that detailed form of display and items to be arranged on the ordinate and the abscissa may be changed according to circumstances.

The first to the third embodiments and the applications of the embodiments have been explained. Several variations and combinations thereof such as use of flowcharts other than those described above are conceivable. It goes without saying that the variations and the combinations belong to the technical scope of the invention as long as the variations and the combinations coincide with constitutions and operations described in patent claims. It goes without saying that the respective embodiments do not deny these and other variations.

In the invention, retrieval is performed in the reproduction mode. However, a retrieval mode aiming chiefly at being used for retrieval may be provided separately. It goes without saying that the invention can be applied to that case.

In the respective embodiments, a digital camera is described as an example of the information managing apparatus. However, a range of application of the invention is not always limited to this. For example, various apparatuses capable of realizing the constitution of the invention such as a camera, a video camera, a cellular phone, a compact disk storing and reproducing apparatus, a DVD recording and reproducing apparatus, and a PC can be understood as the information managing apparatus.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-225814 filed on Aug. 2, 2004, which is hereby incorporated by reference herein.

What is claimed is:

1. An image management apparatus comprising:
   a display unit;
   a storage medium interface for detachably connecting a storage medium having image information stored thereon;
   a creating unit which counts a number of images being analogous to a predetermined key image by analyzing the image information stored on the storage medium connected to the storage medium interface, and creates a characteristic image simultaneously showing a distribution of imaging dates of all of the images that are analogous to the predetermined key image;
   a storing control unit which stores the characteristic image created by the creating unit in the storage medium; and
   a displaying control unit which controls the display unit to display the characteristic image stored on the storage medium at application of a power supply, connection of the storage medium, or shift to a reproduction mode,
   wherein the characteristic image indicates the number of the images being analogous to the predetermined key image, date by date.

2. The image management apparatus according to claim 1, further comprising
   an image sensing unit which senses an image information, wherein the image information is stored in the storage medium.

3. A computer program stored in a computer readable medium and executed by an image management apparatus, the computer program functionalizing the image management apparatus as:
   a display unit;
   a storage medium interface for detachably connecting a storage medium having image information stored thereon;
   a creating unit which counts a number of images being analogous to a predetermined key image by analyzing the image information stored on the storage medium connected to the storage medium interface, and creates a characteristic image simultaneously showing a distribution of imaging dates of all of the images that are analogous to the predetermined key image;
   a storing control unit which stores the characteristic image created by the creating unit in the storage medium; and
   a displaying control unit which controls the display unit to display the characteristic image stored on the storage medium at application of a power supply, connection of the storage medium, or shift to a reproduction mode,
   wherein the characteristic image indicates the number of the images being analogous to the predetermined key image, date by date.

* * * * *